United States Patent
Howard et al.

(10) Patent No.: US 6,496,837 B1
(45) Date of Patent: *Dec. 17, 2002

(54) MULTIPLE ATTRIBUTE FILE DIRECTORY MANIPULATION AND NAVIGATION SYSTEM

(75) Inventors: David E. Howard, Loveland, CO (US); John J. Gandee, Windsor, CO (US); Kurt E. Godwin, Loveland, CO (US)

(73) Assignee: 1Vision Software, Inc., Loveland, CO (US)

( * ) Notice: Subject to any disclaimer, the term of this patent is extended or adjusted under 35 U.S.C. 154(b) by 31 days.

This patent is subject to a terminal disclaimer.

(21) Appl. No.: 09/603,701

(22) Filed: Jun. 27, 2000

Related U.S. Application Data

(62) Division of application No. 08/979,657, filed on Nov. 26, 1997.
(60) Provisional application No. 60/031,926, filed on Nov. 27, 1996.

(51) Int. Cl.[7] .............................................. G06F 17/30

(52) U.S. Cl. ............................. 707/200; 707/102; 707/3
(58) Field of Search .......................... 707/1–4, 10, 102, 707/200–204

(56) References Cited

U.S. PATENT DOCUMENTS

| | | | |
|---|---|---|---|
| 5,047,918 A | 9/1991 | Schwartz et al. | ............ 364/200 |
| 5,129,088 A | 7/1992 | Auslander et al. | ........... 395/700 |

(List continued on next page.)

OTHER PUBLICATIONS

"Mastering Windows 3.1," Special Edition, Sybex, 1992, pp. 105–115, and 122.*

"Iomega Approves Citadel Technology's C:/More! Management Software for IomegaReady Software Program", Company Press Release, Aug. 20, 1997.

"Inside Windows™ 95", Adrian King, Microsoft Press, A Division of Microsoft Corporation, 1994.

"Inside the Windows 95 File System", Stan Mitchell, O'Reilly and Associates, Inc., May, 1997.

*Primary Examiner*—Hosain T. Alam
(74) *Attorney, Agent, or Firm*—Santangelo Law Offices, P.C.

(57) ABSTRACT

The parallel virtual directory system can extend the native file system to provide a superior method for organizing a computer system's physical storage devices or locations. These can include hard disks and removable media or remote storage locations such as on the Internet. Interceptor modules can monitor all file or memory changes such as creations, writes and deletes to the native file system and can pass this information to the parallel virtual directory system. The parallel virtual directory system may be accessed through the native file system methods allowing users to view their file system as it existed at any point in time, including removable media that is no longer present in the system. Further, via the parallel virtal directory system and the Interceptor modules, users can access any file in any of the monitored file systems. The parallel virtual directory system may be implemented using database technology thereby allowing multiple views of the parallel virtual directory system to be offered to the user based on their needs and can thus be used to ease navigation through the file system. Further, a set of information management processes can run at the application level providing data management services such as backup, archiving, recording of digital video programming, or even controlled playback or utilization of that information. The information management processes can configure the parallel virtual directory system to capture the information they require and use the gathered information to efficiently complete their data management functions.

122 Claims, 24 Drawing Sheets

U.S. PATENT DOCUMENTS

| | | | |
|---|---|---|---|
| 5,313,646 A | 5/1994 | Hendricks et al. | 395/600 |
| 5,333,315 A | 7/1994 | Saether et al. | 395/600 |
| 5,355,497 A | 10/1994 | Cohen-Levy | 395/700 |
| 5,361,349 A | 11/1994 | Sugita et al. | 395/600 |
| 5,459,867 A * | 10/1995 | Adams et al. | 709/321 |
| 5,463,772 A | 10/1995 | Thompson et al. | 395/600 |
| 5,504,863 A | 4/1996 | Yoshida | 395/184.01 |
| 5,504,892 A | 4/1996 | Atsatt et al. | 395/600 |
| 5,544,360 A | 8/1996 | Lewak et al. | 395/600 |
| 5,553,285 A | 9/1996 | Krakauer et al. | 395/600 |
| 5,561,799 A | 10/1996 | Khalidi et al. | 395/600 |
| 5,568,639 A | 10/1996 | Wilcox et al. | 395/600 |
| 5,603,019 A | 2/1997 | Kish | 395/621 |
| 5,680,559 A | 10/1997 | Chew et al. | 345/335 |
| 5,764,972 A | 6/1998 | Crouse et al. | 707/1 |
| 5,778,384 A | 7/1998 | Provino et al. | 707/200 |
| 5,819,275 A | 10/1998 | Badge et al. | 707/100 |
| 5,897,638 A | 4/1999 | Lasser et al. | 707/102 |
| 5,940,613 A * | 8/1999 | Berliner | 709/324 |
| 6,018,744 A * | 1/2000 | Mamiya et al. | 707/1 |
| 6,185,574 B1 * | 2/2001 | Howard et al. | 707/102 |

* cited by examiner

| Record 1 | Record 2 | Record 3 ............ |
|---|---|---|
| ELEMENT NAME | ELEMENT NAME | ELEMENT NAME |
| ELEMENT TYPE | ELEMENT TYPE | ELEMENT TYPE |
| ELEMENT SIZE | ELEMENT SIZE | ELEMENT SIZE |
| CREATE DATE & TIME | CREATE DATE & TIME | CREATE DATE & TIME |
| MODIFY DATE & TIME | MODIFY DATE & TIME | MODIFY DATE & TIME |
| ACCESS DATE & TIME | ACCESS DATE & TIME | ACCESS DATE & TIME |
| USER TAG | USER TAG | USER TAG |
| RECORD LINKS | RECORD LINKS | RECORD LINKS |
| PARENT LINK | PARENT LINK | PARENT LINK |
| CHILD LINK | CHILD LINK | CHILD LINK |
| ELEMENT ATTRIBUTES | ELEMENT ATTRIBUTES | ELEMENT ATTRIBUTES |
| STORAGE DEVICE | STORAGE DEVICE | STORAGE DEVICE |

FIG. 17

DIRECTORY OF C:

| AUTOEXEC | BAK | 263 | 04-10-95 | 7:54a |
|---|---|---|---|---|
| AUTOEXEC | BAT | 295 | 03-31-96 | 3:37p |
| COMMAND | COM | 54,645 | 05-31-94 | 6:22a |
| CONFIG | BAK | 247 | 04-10-95 | 7:51a |
| CONFIG | SYS | 471 | 03-31-96 | 3:37p |
| PATENT1 | APP | 66,731 | 07-29-97 | 6:00p |
| PATENT1 | BAK | 60,124 | 06-11-97 | 12:15p |
| CASABLANCA | MOV | 200,506,444 | 05-05-97 | 8:00p |
| MALTESE | MOV | 179,654,320 | 05-05-97 | 8:15p |
| SIERRAMADRE | MOV | 202,114,631 | 05-05-97 | 8:30p |

FIG. 20

DIRECTORY OF H:

| ELEMENT NAME | ELEMENT TYPE | ELEMENT SIZE | CREATE DATE & TIME | STORAGE DEVICE | BACKUP DRIVE #1 | BACKUP DRIVE #2 | BACKUP DRIVE #3 | DESCRIPTION |
|---|---|---|---|---|---|---|---|---|
| AUTOEXEC | BAT | 253 | 04-10-95/7:54a | C: | D: | E: | F: | INDEPENDENT FROM NETWORK VERSION |
| AUTOEXEC | BAT | 295 | 03-31-96/3:37p | C: | D: | E: | F: | NETWORK VERSION |
| COMMAND | COM | 54,645 | 05-31-94/6:22a | C: | D: | E: | F: | ORIGINAL VERSION |
| CONFIG | SYS | 471 | 03-31-96/3:37p | C: | D: | E: | F: | INDEPENDENT FROM NETWORK VERSION |
| CONFIG | SYS | 247 | 04-10-95/7:51a | C: | D: | E: | F: | NETWORK VERSION |
| PATENT1 | APP | 66,731 | 07-29-97/6:00p | C: | S: | T: | U: | FINAL VERSION |
| PATENT1 | APP | 60,124 | 06-11-97/12:15p | C: | S: | T: | U: | DRAFT W/O CLAIMS |
| PATENT1 | APP | 15,273 | 06-07-97/4:59p | C: | S: | T: | U: | BACKGROUND & SUMMARY |
| CASABLANCA | MOV | 200,506,444 | 05-05-97/8:00p | C: | X: | Y: | Z: | |
| MALTESE | MOV | 179,654,320 | 05-05-97/8:15p | C: | X: | Y: | Z: | "THE MALTESE FALCON" |
| SIERRAMADRE | NOV | 202,114,631 | 05-05-97/8:30p | C: | X: | Y: | Z: | "THE TREASURE OF THE SIERRA MADRE" |

FIG. 21

MULTIPLE ATTRIBUTE FILE DIRECTORY MANIPULATION AND NAVIGATION SYSTEM

This application claims priority, as a divisional application, from the parent U.S. application Ser. No. 08/979,657, filed Nov. 26, 1997, which claims the benefit of U.S. application Ser. No. 60/031,926, each hereby incorporated by reference filed Nov. 27, 1996.

BACKGROUND OF THE INVENTION

Generally, this invention relates to the field of enhanced organization of computer memory or file information and processes for managing the computer memory or file information at other than simply the application program level. It may be used to overcome the usability barriers associated with He coupling and uncoupling of storage devices to a computer system. Specifically, the invention focuses on methods to gather information about hierarchical directories on physical file storage devices, the organization or manipulation of directory information into a global virtual directory system that can serve as a master directory for a user and processes that more efficiently manage system data, regardless of application, based on information obtained from the virtual directory system.

Over the years, the hierarchical directory system that organize computer system data storage have been enhanced to make them more powerful and easier for the end user to understand. Typically these improvements have focused on a shift from a y oriented system to systems that are graphically oriented (for example, the shift from a DOS type of directory listing to a graphical directory display of files as provided by products like Microsoft™ Windows™ for Workgroups ver. 3.11. This approach has been directed at increasing the user's understanding of the files available, but has not solved the problems caused by a rigid directory structure nor the difficulty in locating files that have been removed from the system or that are located in the maze of subdirectories.

The hierarchical directory systems are intended to allow users to organize their data in ways that makes it easier for them to understand. This is done by creating directories, or folders, for specific classes of data such as word processing documents or computer programs. Once a directory structure for the storage system is defined it becomes a tedious and difficult task to reorganize the directory structure. Also, files of the same name cannot be stored within the same directory due to the common need for files to be differentiated by unique names even though it is common for users to desire to save copies of the same file at different points in the evolution of the file. For example, it would be very convenient if a writer could keep the same file name for an article and differentiate the various versions of the article by the date and time of creation of each version rather than having to use minor variations on the original name.

Perhaps surprisingly, the concept of flexibly organizing a hierarchical directory system has typically been utilized at only the application level; that is, it has been applied only in separately utilized programs which may act independently of other programs and not as one which applies to all programs. For instance, an application level process which addresses a user need for the ability to easily recognize, filter and search files is identified in U.S. Pat. No. 5,544,360 which describes an application program that allows the user to filter and categorize the hierarchical directory system to ease finding files. The limitation of this invention is that it is an application program, or file manager, that can be used as a browser by the user but not directly accessed by other programs in the same manner that the native hierarchical directory system can be accessed. Hence, a second application program such as a word processor would not be able to utilize the sorted information only the original application program could. Hence, there is a need for a configurable directory system that can be configured and made accessible at the operating system level such that all application programs can utilize the configured information.

A common constrain of the traditional or conventional directory hierarchy is that it is oriented towards a hierarchical starting point of physical storage device, be it a hard disk, floppy disk, high capacity removable disk, tape, remote network device, or other storage media. Due to the coupling of a physical device to the directory hierarchy the user must organize their data in such a way that it fits the physical parameters of the selected storage medium.

Various methods have been employed to try to decouple the physical nature of the storage device from the directory hierarchy. It is relatively common in network environments to present a file server as a single storage entity even though it is composed of multiple hard disks (disclosed in U.S. Pat. No. 5,129,088). Or, a new file system can be created as in U.S. Pat. No. 5,333,315 to create a file system that is based purely on the hierarchy of the directory name space and not that of physical device. Again in the network setting, a method called hierarchical storage management is employed that has the primary purpose of freeing up storage space on a physical device, such as a hard disk by migrating files to another storage device, such as a tape drive, and leaving a place holder for the file so that it appears to the user that the file is still on primary storage. When the place holder file is accessed, the hierarchical management system retrieves the file from secondary storage (disclosed in U.S. Pat. No. 5,564,037). This same technique has been employed on a desktop computer using the desktop computer's local storage devices. These techniques allow the user to treat multiple storage devices of dissimilar nature as a single device. Such systems, however, only offer the user limited organizational control over the data. They do not offer the full ability to manipulate the file system information as does the present invention and are often limited to merely migrating data to secondary storage devices.

With the recent advent of low cost, high capacity removable storage, and the ability to store data remotely on the Internet, it is becoming increasingly difficult for the user to organize their data and to recall where their data is located. A 100 MB removable disk can store hundreds or thousands of data files. Likewise, a remote storage site on the Internet used for archiving might have thousands of a user's data files. Hence, the sheer volume of files that can exist on individual directories often makes it a very difficult task to find a stored file without traversing through hundreds of subdirectories. In the case of removable disks a user may have ten or more disks each with hundreds of files. Very clearly it becomes difficult to understand what file is stored where. Furthermore, the need for removable storage, or remote storage is increasing rapidly due to the easy availability of data on the Internet and the shift towards digitized video information (e.g., movies stored as digital information that can then be shown on your computer) which consumes great amounts of computer storage. Hence, there is an ever-increasing need for a directory system that can keep track of all of these files on a single database that is accessible to an operating system.

In addition, one characteristic that high capacity removable storage, for example, has is that if the disk is removed from the computer system or if the Internet connection is not active the user may not be able to determine which files are stored on the disconnected device until the disconnected device is reconnected to the computer system. Essentially, these conventional directories are transient in nature since their information is lost to the system when the memory devices are disconnected or removed from the system. Hence, there is a need for a directory system that maintains directory information that a user of a computer system (i.e., a computer operator) can utilize even when the storage media is not coupled to the computer system.

Also, while some large computer systems have been able to enhance file directory capabilities, such capabilities have been sorely lacking for unitary computer systems. Hence, the overwhelming majority of computer users who have standalone personal computers, which might also be connectable to a larger computer system, have had a need for a system that can provide the unique file management and tracking capabilities mentioned.

Several key problems still exist with conventional directory structures. The first of these is the somewhat rigid nature of the directory structure once such a structure is defined; which, for example requires that unique file names be used as the identifier within a directory. A second problem is the somewhat arbitrary organizational barrier that is presented by the coupling of physical storage devices and their related sizes to the hierarchical directory structures commonly used in computer storage; which for example, limits the number of files stored in a directory by the storage size of the physical storage size rather than permitting the user to include additional files whose file data would exceed the physical storage limitations of the physical storage device. A third problem is the transient nature of the hierarchical directory structure encountered when using removable or remote storage; which, for example, is often the result of the directory information for a storage medium only being present when the storage medium is connected to the system. These problems make it difficult for both computer users and data management programs to organize and efficiently work with a computer file system, if at all.

While there have been a number of attempts to solve these problems, in general the attempts have failed to address them from a perspective which present embodiments of the invention realized.

Importantly, the present invention arrives at its solutions in manners which maintain compatibility and accessibility of a native file directory system. The new file system presented by several embodiments of the invention does not necessarily replace the native file system that the end user has selected; but rather, it is capable of working in concert with the native file system. In this manner, it can provide, for example, a file system for use by both the operating system of the computer system and application programs of the computer system.

SUMMARY OF THE INVENTION

The present invention includes a variety of aspects which may be selected in different combinations based upon the particular needs being addressed. The first aspect of the invention is that it in no way interferes with the current operation of the computer system's hierarchical directory structures or coupling to physical file storage devices. The end user may continue to use the file storage system in the same fashion to which they have become accustomed. In addition, application programs may continue to use the file storage system without modification. However, various components of the virtual directory and navigation system can seamlessly link with the operating system of the computer to provide a parallel method for organizing, accessing and maintaining the computer system's storage. In addition, this capability can be provided for a unitary computer system, such as a personal computer that can operate as a standalone unit.

First, a set of active processes can be used to traverse a native file system's directory hierarchy and relay the directory information to the virtual directory system for organization and permanent storage (e.g., traversing the directory of the hard drive on a personal computer and copying the directory information to the t directory system). Then, Interceptor modules can be used to link with the native file system's I/O procedures to passively intercept changes being made to the native file system as those changes occur. This night be done for all physical file storage devices of the computer system and regardless of the application program being run. The Interceptor modules then can relay the changes to the virtual directory system for organization and permanent storage. Using this method the native file system's hierarchical directory can be maintained at the same time that a parallel virtual directory system is built and updated.

Another feature of the invention is that when a new piece of removable media is inserted into the computer system, or a remote storage site is connected to the computer system, the Interceptor modules can detect the coupling of newly mounted media to the system, actively read the directory structures of the mounted media, and relay the directory structures' information to the virtal directory system. Changes to the directory information of the mounted media can be detected and transferred to the virtual directory system.

An important benefit of the invention is that the virtual directory system also can connect to the native file system of the computer system in such a way that the virtual directory system appears to be a physical storage device. However, it has the advantage that if a user elected to the virtual directory system could represent all of the files contained on all of the physical file storage devices connected to the computer system. Because the files stored on the physical storage devices can be represented in the virtual directory system and because the virtual directory system has among its characteristics the qualities of a relational database, the file information for the various files can be reorganized, reconfigured, or searched easily. These features allow the user greater flexibility in how files are viewed and how the user finds data. Additionally, the database can overcome the requirement of unique file names, as imposed by traditional hierarchical directory systems. Multiple instances of a given file name can now be presented in the same directory with the uniqueness of the file data determined by the time the file was modified, the media it was stored on, or some other file characteristic.

When a user accesses a file via the virtual directory system the virtual directory system can retrieve the file from the appropriate storage device via the Interceptor modules. If the user accesses through the virtual directory system a file that is not on-line because the media is not mounted (i.e., connected to the computer system) or the network connection is not active, the virtual directory can automatically load the media if it can be done via mechanized means, prompt the user to assist in loading the required media, or even establish a connection to the service having the media. This removes the burden from the user of needing to search multiple pieces of media to find the desired file. Similarly, when a user stores a file via the virtual directory system, the virtual directory system can store the file in a preselected storage location, prompt the user for storage location instructions, or assist, as mentioned above, in coupling the appropriate storage device to the computer system.

Information management processes (IMPs)(3) can provide more efficient execution of storage processes due to their understanding of the virtual directory system's unique information capabilities. These information management processes can be accomplished as application programs that communicate directly with the virtual directory system's database through a private interface, such as the local interface in the Microsoft™ Windows™ 95 system. The information management processes benefit from their ability to share a common directory system that spans all media types. For example, this means that an application that specializes in disk grooming processes (removes files to that have not been used for a long period of time) can verify that the system's backup program has copied one or more instances of the file to be groomed (removed from the hard disk) thereby ensuring that, should the user decide to access the file in the future, that a copy of the file is stored on removable media or a remote storage site.

BRIEF DESCRIPTION OF THE DRAWINGS

FIG. 17—Shows an alternative file database entry with file attribute fields designated.

FIG. 20—Shows a typical hierarchical directory listing for a native file directory.

FIG. 21—Shows a database listing of file attribute information contained in configurable virtual directory database.

DETAILED DESCRIPTION OF THE PREFERRED EMBODIMENTS

Figure 1:
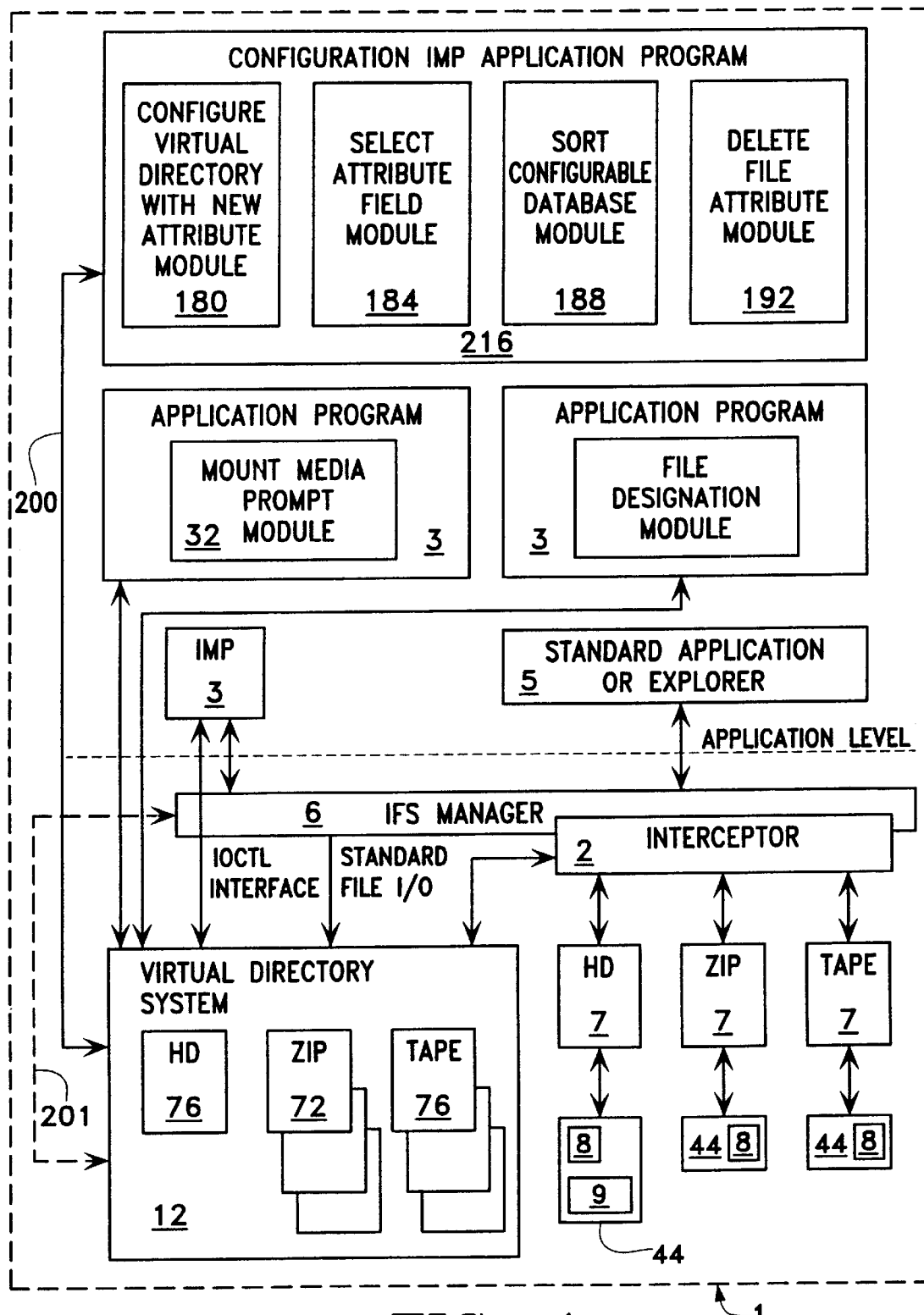
FIG. 1—Shows the interconnections that may be utilized between one type of apparatus according to the invention and the operating system.

As can be easily understood, the basic concepts of the present invention may be embodied in a variety of ways. It will be seen to involve both methods of handling and utilizing information as well as devices or programming to accomplish the appropriate results. In this patent, the techniques disclosed should be understood to encompass a variety of devices which may be used to achieve the results described. In many cases, the device elements are simply the natural result of implementing the methods as intended and described. In addition, while some devices and programs are disclosed, it would be understood that these not only accomplish certain methods but also can be varied in a number of ways and accomplished by means recognized by those of ordinary skill in the art. Importantly, as to all of the foregoing, all of these facets should be understood to be encompassed by this disclosure.

As mentioned earlier, the present invention includes a variety of aspects which may be combined in different ways. Each of these aspects is first discussed separately. For exemplary purposes a preferred embodiment is described within the context of the Microsoft™ Windows™ 95 environment, however, similar embodiments are possible within other system environments as those of ordinary ski in the art would readily understand. As a starting point, one possible configuration of an embodiment of the invention can comprise an apparatus that presents to a user or operating system, for example, a native hierarchical directory, a virtual directory system comprising a configurable, extensible database that can retain and organize file attribute information also stored in the native hierarchical directory, an interceptor apparatus that intercepts and relays information transmitted along the native file system's I/O interface to the virtual directory system, and application programs that orchestrate information management processes on the database of the virtal directory. Embodiments of the invention also can include the methods by which the above mentioned apparatus interact.

For purposes of this patent, the term "Presenting" is intended to mean either displaying on a computer screen or providing or making available for use, such as enabling an operating system and/or application program to use a file. Similarly, the term "native directory" is intended to mean the directory of a physical file storage device that is stored on the physical file storage device and facilitates access to the files stored on that physical file storage device (e.g., the native directory of one's "C" hard drive would be the directory of files stored on the C: hard drive and which is stored on the C: hard drive). Also, a "virtual directory" is a directory of file information which can be presented to a computer operator, operating system, application program or some other aspect of a computer system as a directory that is representative of a physical file storage device(s); however, this virtual file directory is merely an apparent or "virtual" directory since it can merely store file attribute information and is not actually affiliated with an actual physical storage device, as one would associate the affiliation between one's "C: hard drive" on an IBM personal computer and the directory listing for that hard drive. However, it can be representative of a physical fie storage device in that the operating system would communicate with it in the same way that the operating would communicate with a directory for an actual fie storage device (e.g., in issuing open/read/write delete requests to a fie system driver for a storage device.) Finally, "file attribute information" is intended to mean properties of a file in defined categories, such as, for example, file name, type of data represented by the file (e.g., text file, executable file, Wordperfect 6.1 file, etc.) file size, date and time of file creation or modification, date and time the file was accessed, programs which caused the file to be accessed, physical file storage device where file data for the file is stored, parent directory on the physical file storage device in which the file is stored, child or subdirectory for the file, user defined descriptions for the file, etc.

The virtual directory system can serve many functions and appear in different embodiments. Perhaps one of its most useful functions is the ability to store file attribute information (16) about files stored on a native file directory system (8) and present that file information as if the files were stored in a distinct directory separate from the native file directory system.

The virtual directory system is significant in that it can provide in a single database a configurable database of file information which act as links to the actual file data. No longer is a user constrained by the physical limits of a storage device as to how many files can be listed in a single directory, as is the case with a single hard drive. Also, this database is configurable so that the directory can be manipulated into a new configuration and can make files available at an operating system level. This is a very significant feature, because it allows the newly configured directory to be made available at the operating system level to application level programs. In this fashion, a user could configure the virtual global directory with all of the user's word processing data files. Then, when the user wanted to find an old word processing data file, only the virtual directory would need to be accessed. This would save the user from having to search through all of the various directories on the computer system until the desired word processing document was located.

Similarly, the virtual directory system allows a user to store all of the files on the computer system in a single directory, if desired. This can be accomplished because the virtual directory system is only keeping track of file attribute information for particular files—not the file data itself Hence, with a database, the virtual directory system can easily keep track of the file attribute information for every file encountered in the computer system. Hence, the virtual directory system can provide a single directory where all of the user's files are "virtually" stored and which can be easily searched rather than needing to search through the computer system's entire directory system. This benefit can easily be appreciated given the sheer volume of files with which a computer system comes into contact over its lifetime. For example, consider a computer system that has a floppy drive in which 100 floppies are used over its lifetime, a hard drive which stores three thousand files throughout 250 subdirectories, five ZIP disks used on a ZIP drive which each store 1000 files, a tape backup system which stores thousands more files, a CD ROM drive which uses 10 CD ROMs, each storing thousands of files, and an Internet connection which can access an Internet storage site where hundreds of thousands of files are stored. The search for a file that you know you encountered 5 years ago, but don't remember where, would be a Herculean task. Yet, with the virtual directory system, all of the file information for those thousands of files can appear in a single directory which can be easily searched.

Furthermore, because the virtual directory system can be stored on a configurable database, the directory itself can be subdivided into additional virtual directories. Hence, a user can group all of the word processing applications into a single directory, all of the letters to relatives (which also are stored in the word processing directory) in a second directory, and all of the letters to Aunt Margaret (which are also stored in each of the first two directories) in a third directory. Then, each of these directories can be utilized by application programs as if they were directories of actual physical file storage devices, such as a local hard drive. The application programs which utilize the file information do not need to be able to configure the database of the virtual directory, rather the directory can be configured at the operating system level and therefore it can appear as a physical storage device when called by the application level programs that need files represented by the virtual directory system. (It should be understood, however, that the virtual file directory system can be configured by an application level program. Therefore, the configuration can be accomplished quite easily when a new configuration is desired.) While prior application programs may have been able to search a native file directory system in order to create a desired grouping of files, these application programs did not make the groupings available for other application programs. For example, search of a directory system by a WordPerfect™ word processing program might have created a listing of files of all of a company's annual reports; however, that listing was not then accessible by a WORD™ word processing program as a separate directory. Rather, the WORD™ program would have to repeat the search, as would the WordPerfect™ program when it was reimplemented. Hence, the ability to configure the virtual file directory at the operating system level is a significant feature of this embodiment of the invention. Others have apparently failed to appreciate the ability to accomplish this important feature or may have believed that it was not functionally implementable do to hardware constraints. However, with the development of new operating systems, the embodiments of the present invention will and are implementable to accomplish greatly improved performance over present rigidly structured directory systems.

Importantly, the use of the virtual file directory system need not affect the existing native file directory system The native file directory system can still be used as usual by the computer system. Hence, there is no loss of compatibility of old application programs when a virtual directory system is implemented. Rather, the virtual directory system can enhance the computer's file system with its unique abilities, while not destroying the native file directory system which a user or application program might simply prefer to use. This is an important feature of the virtual file directory system as many prior attempts at creating enhanced file systems, especially extensible file systems, destroyed the compatibility of the native file directory. Hence, older programs which were not designed for the newer version lost compatibility. As those of ordinary skill in the art are well aware, compatibility of a new file system with existing application programs is perhaps the most important feature that a product must have. The virtual directory system can provide this, while others have apparently not been able to do so.

Figure 2:
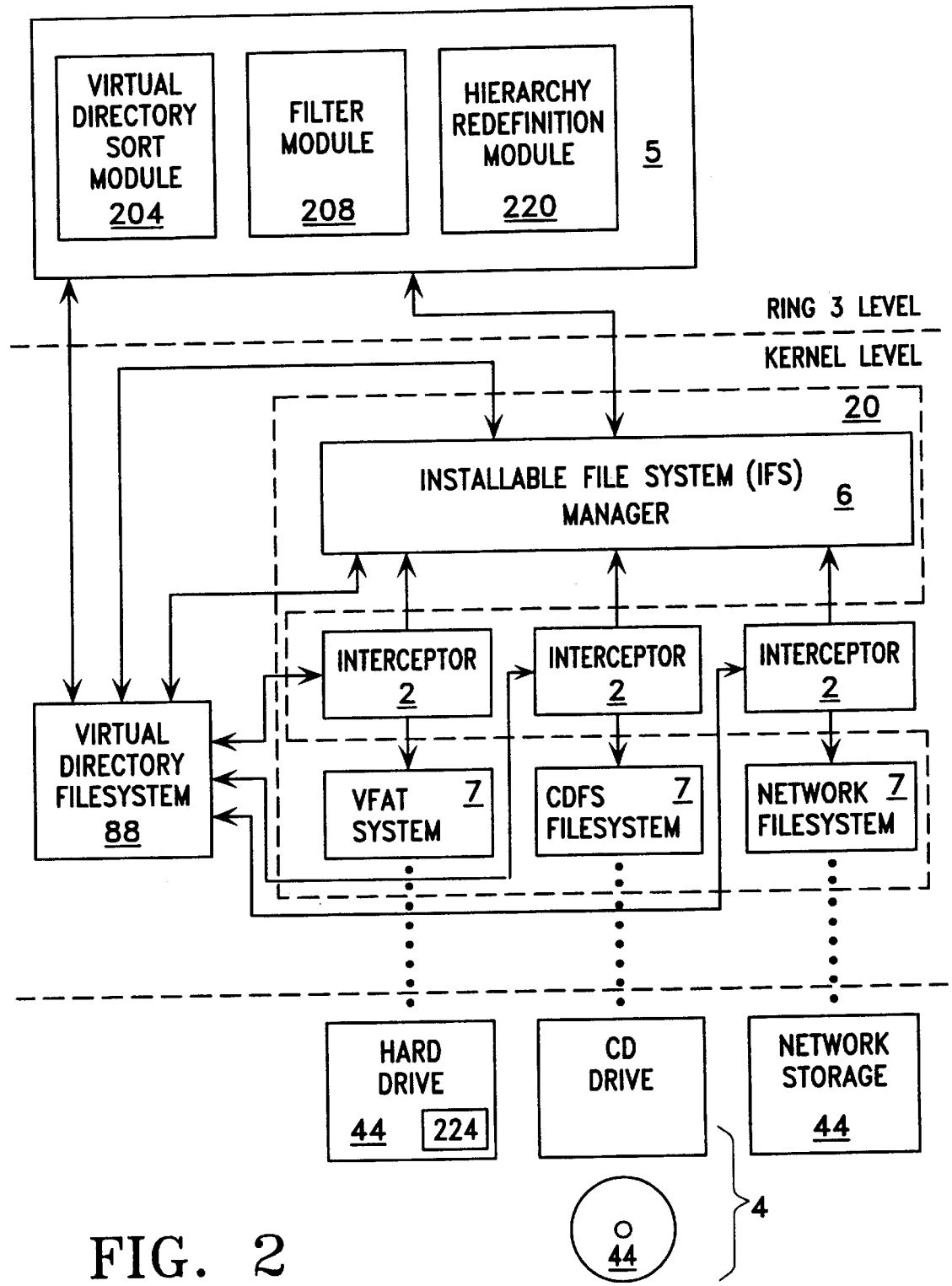
FIG. 2—Shows an alternative embodiment of the virtual file directory system being used in conjunction with a native file directory system.

With reference now to the figures, implementation of embodiments of the virtual file directory system can be seen. In FIG. 1, use of the Windows™ 95 System is utilized to demonstrate the architecture of the viral file directory system. In FIG. 1, a native fie directory system (8) can be seen. In the Windows™ 95 environment, this native file directory system (8) can be comprised of the Installable File System (]FS) Manager, several file storage devices (4), and the device drivers for the various file storage devices. These file storage devices could be either a storage medium (44) or the storage medium in combination with the device that couples the storage medium (44) to the computer system (1), such as a ZIP drive which couples a ZIP disk to the computer system or the storage medium itself (A storage medium would be any device used to store file data, such as a floppy disk, a ZIP disk, a tape used in a tape drive, a compact disk (CD), a hard drive, an Internet storage device memory, etc.) In Windows 95, the boxes labeled HD, ZIP and TAPE would be "file system drivers" for the storage media (44). Each storage medium (44) would typically comprise a directory of file attribute information (16) in a directory structure for the files stored on that storage medium. An interceptor (2) is shown between the IFS Manager and the other components of the native file directory system. The Interceptor will be discussed in more detail elsewhere. FIG. 1 also shows a standard application program (5) (or similarly an Explorer) at the application level of the computer system (1). An operating system (20) can provide communication between the application program (5) and a native file directory of the native file directory system (8), as well as with the virtal directory system. A typical operating system for Windows™ 95 can be seen in FIG. 2. The operating system in FIG. 2 is merely exemplary, as other operating systems may easily vary in their components and operability.

A virtual file directory system (12) is shown in FIG. 1 adjacent the native file directory system components. However, note that no physical file storage device is associated with the virtual directory for storage of data files, as is the case with the native file directory system. In this manner, the virtual directory system is "virtual." It does not store actual file data. Rather, it points or directs one to the location where the file data is stored and can keep track of file attribute information in order to identify the file data. In contrast, the native file directory system is directly coupled to the physical file storage devices themselves, such that a call to the native file directory system is essentially directed at the physical storage device itself In FIG. 1, the virtual directory system is shown configured into three virtal drives: a hard drive, a ZIP drive and a tape drive. In this fashion, the virtual directory file system might be representing the files stored on the hard drive, ZIP drive and Tape drive shown as part of the native file directory system. Or, it might only be listing the word processing documents on each of those storage devices. It could even be representing other hard disk, ZIP and tape drives not currently connected to the computer system. While the virtual directory system might only be configured as a single directory, the embodiment in FIG. 1 shows the ZIP drive of the virtual directory system as a first virtual directory, the hard drive as a second virtual directory (76) and the tape drive as a third virtual directory. Furthermore, because the ZIP drive block is associated with coupling and presenting information for a removable storage media, it can be considered a presentation element which presents directory of file information for a removable storage medium (72)

The virtal directory system can be coupled to the interceptor (2) to allow the passage of data and commands between the interceptor and virtual directory system. Furthermore, the virtual directory system can be connected to the I/O system of the operating system (20) for the computer system (1). In FIG. 1, this is shown as a coupling to the Installable File System Manager of Windows™ 95. Input/Output (1(0) requests in Window 95 are passed through this IFS Manager (6). Through this path or interface, the virtual file directory can receive commands from an application program, operating system utility, or other program for a file represented on the virtual file directory system. Typical standard I/O commands could be open, read, write, close or delete commands among others. While such commands would typically be supported by a standard I/O interface of a computer system, other commands might not. Hence, the virtual file directory system can also be connected to the application level of the computer system via a private interface (200). In Windows™ 95, this private interface can be accomplished by an IOCTL command module. The private interface allows an application program to communicate directly with the virtual directory system without having to go through the standard I/O components. This permits, for example, an application level program to configure the database of the virtual directory system. Such configuration commands would not be recognized by the standard I/O interface, hence an error would typically occur. Hence the private interface allows unique commands which the application level program and the virtual directory system understand to be passed between the two. In addition, the private interface can be used to add information to the virtual directory system database. As described elsewhere, the virtual directory system can be extended with additional information for each file record or collection of file attribute information. Hence, as new categories of file attributes are created, the private interface allows a user to enter information about a file to the virtual file directory system database.

In FIG. 1, the IOCTL interface is shown between the application program labeled IMP and the virtual directory system. In addition, private interfaces are shown between several other application programs at the application level and the virtual directory system.

An additional connection (201) is shown in a dashed line between the virtual directory system and the I/O system of the operating system. In FIG. 1, the I/O system is shown in part as the Installable File System Manger. This connection or coupling shows that the virtual directory system might transfer data and commands back up to the application level to input and output information through the I/O system. As a simple example, the virtual directory system when accessed for a file shown on its virtual rectory listing can locate the actual physical storage location for the requested file and initiate its own request back through the installable file system. In this manner, the virtal directory system can request a file from the C: drive, for example, then present it to a word processing program as actually having come from the virtual file directory itself In this fashion, the virtal directory system can emulate or act as an actual physical storage device.

Figure 3:
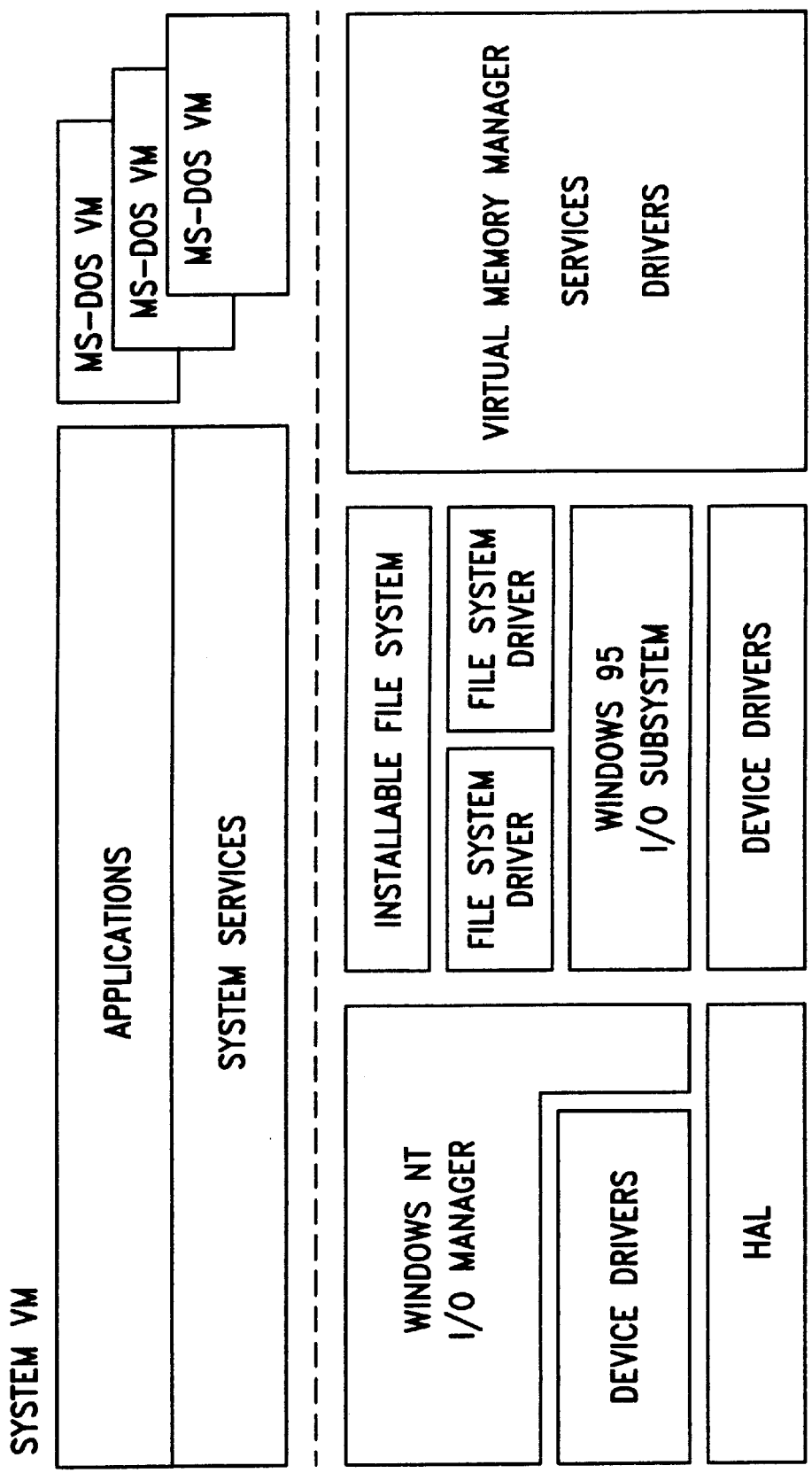
FIG. 3—Shows a block diagram of the Windows™ 95 as well as NT operating systems and file system components which may be utilized.

FIG. 2 shows an alternative block diagram of a computer system. Again, in FIG. 2 a Windows™ 95 embodiment is used. FIG. 2 demonstrates that the native directory file system components and the virtual directory system components all can be part of the Kernel level or Ring 0 level in Windows™ 95, whereas the application program can exist at the application level or Ring 3 level in Windows™ 95. For point of reference, FIG. 3 shows a typical schematic of the Windows™ 95 and Windows NT operating system components. These include Window™ NT I/O manager, Device Drivers, HAL, the Installable File System, File system drivers, Windows™ 95 I/O subsystem, device drivers, Virtual Memory Manager/Service/Drivers. In addition, System VM, applications, system services, and MS DOS VMs are shown.

Figure 4:
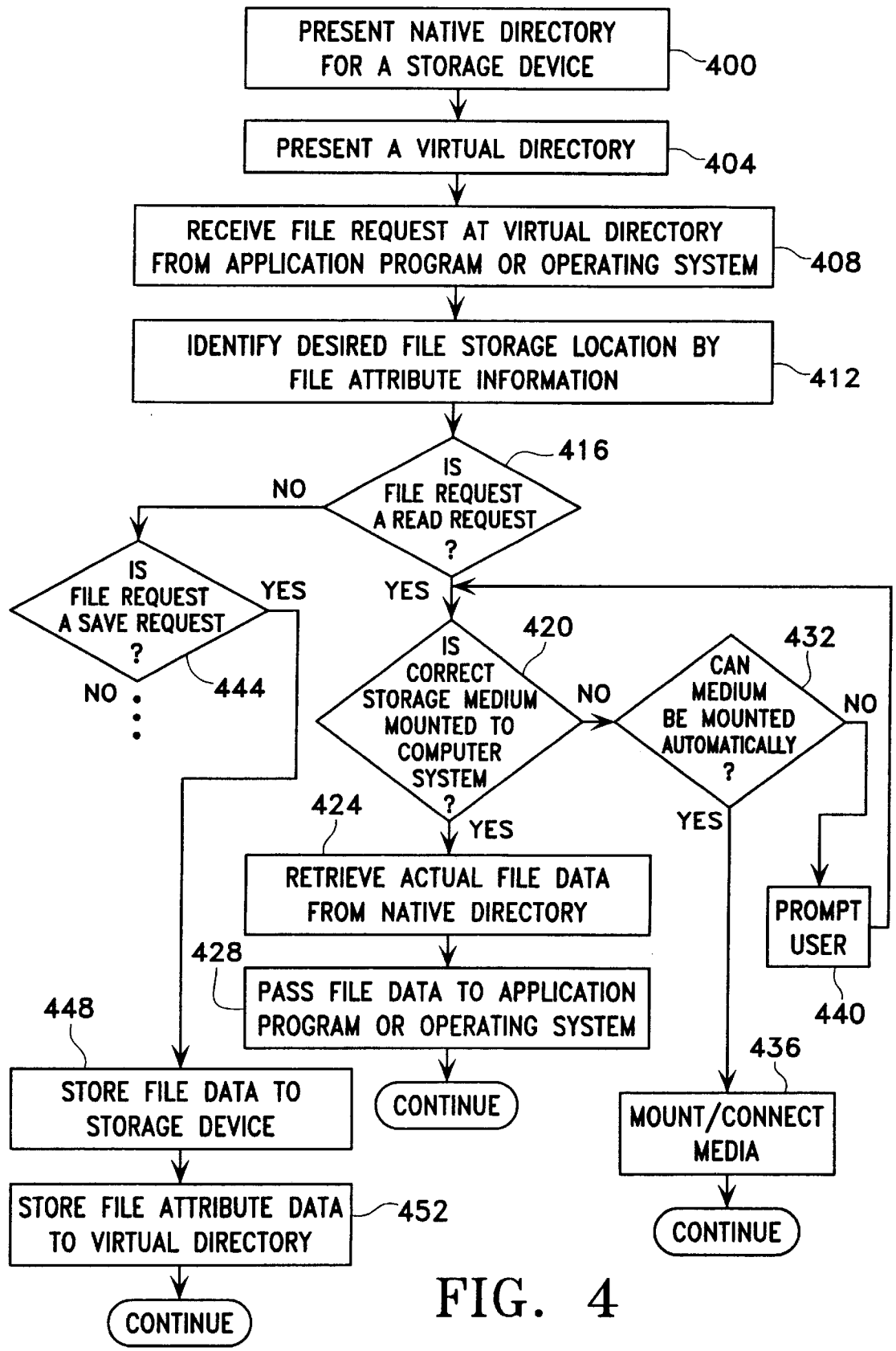
FIG. 4—Shows a flow diagram for use of a virtual directory system to obtain file data from a native directory and pass the information to an application program.

FIG. 4 shows a method of utilizing one embodiment of the virtual directory system. In this embodiment, a typical computer system which has access to a plurality of storage devices can be used. For example the computer system may have access to a hard drive and a floppy drive or a hard drive and an Internet connection. Each of these file storage devices could easily store many files. Furthermore, for each file stored on the file storage devices, there would be file attribute information listed for each file in a directory structure of that storage device. The file attribute information would describe the file and identify it from other files. For example, an element name (PATENT1) an element type (.app), an element size (66,731), create date (Jul. 29, 1997), and create time (06:00) might exist as part of the directory structure as file attribute information for that file. This can be understood further by reference to FIG. 17, FIG. 20 and FIG. 27. As a first step of the process, the native directory of at least one of the physical file storage devices can be presented (400). Presenting is intended to mean not only the displaying of directory information on a computer screen to a user, but also the providing or making available for use of the information, such as enabling an operating system or application program to access or store a file. The native directory system's connection to the I/O procedures of the operating system allows it to be presented to the operating system and application programs, for example. In addition, a virtual directory system can be presented for use by an operating system (404). As noted earlier, this is a very unique function that others apparently failed to achieve before the present embodiment of the invention. Furthermore, the virtual directory can be presented as representative of a physical file storage device, such that the operating system can access through the virtual directory files represented by the file attribute information on the virtual directory. Such access can also be deemed to mean storage of new files through the virtual directory system such that the new files are represented by the newly stored file attribute information. The virtual directory can be presented as accessible to an application program as well as to the operating system. This can be accomplished, for example when the virtual directory system exists at the operating system or kernel level.

Figure. O demonstrates one embodiment of how the virtual file directory system can be used to retrieve or save a file. In this embodiment, a command from application level or operating system level can be received and accepted for a file presented on the virtual file directory (408). In the Windows™ 95 system, this command would be received by the virtual directory system file system driver from the Installable File System Manager. Then, a retriever element presents which retrieves a file (24) can be used to cause retrieval of the file presented by the virtal file system directory. Such a retriever element could be comprised of a program code module located in the virtual directory system. In one embodiment, it could be comprised of the code that accesses the appropriate storage media, communicates the desired storage location of the file and receives the file from the physical storage device. When a file request is received, the actual physical file storage location of the file can be retrieved from the virtal directory system database. First, one can determine whether the file request is a read request (416). (For purposes of this example, it is assumed that a read request accomplishes both an open file and read file command as commonly understood by those of ordinary skill in the art. Similarly a write request is understood to mean write file and close file commands.) Then it can be determined whether the desired storage medium is connected to the computer system (420). The use of the word "connect" is intended to encompass any coupling of a component (e.g., a storage medium) to the computer system, whether such coupling is electronic, optical or by other means. In the case of storage media, a connection to the computer system is also referred to as the media being mounted. Therefore, use of the word mount should be understood to mean coupling of the storage medium to the computer system such that the storage medium can be accessed by the computer system for file information. If the medium is not mounted, one option is to mount the media automatically, via an automatic dialer for the Internet or automatic mechanical means for disk and tape devices (436), or in other manners as those of ordinary skill in the art would readily understand. (Automatically is understood to mean that the computer operator does not need to assist in mounting the storage medium.) If the media cannot be connected automatically (432), such as a floppy disk under the control of a user, a message can be sent to an application level program, for example through the private interface, to prompt the user via a pop-up screen to load the proper storage media (440). Then, the storage device can be polled to determine when the removable media is inserted and the newly inserted media can be checked to confirm that it is the desired media. With the media connected to the system, the desired file data can be retrieved to the virtual directory and passed back to the application program or operating system that requested it. Program code modules which make up part of the virtual directory system code or application programs called by the virtual directory system can be used as: a determine element which determine whether a storage medium is connected (28), a prompter element which determines a computer user to mount media (32), a mounter element which automatically mounts the storage medium (36), a connector element which automatically establishes connection with a remote storage device (40).

As shown in FIG. 4 the virtual directory system can check to see if the file request is a file save request (444). Nit is, the physical storage space can be accessed with the physical storage space descriptor element from the virtual directory system database and the file data stored to the physical storage device (448). In addition, the virtual directory system can be updated with the file attribute information for the file in the virtual directory database (452).

Figure 5:
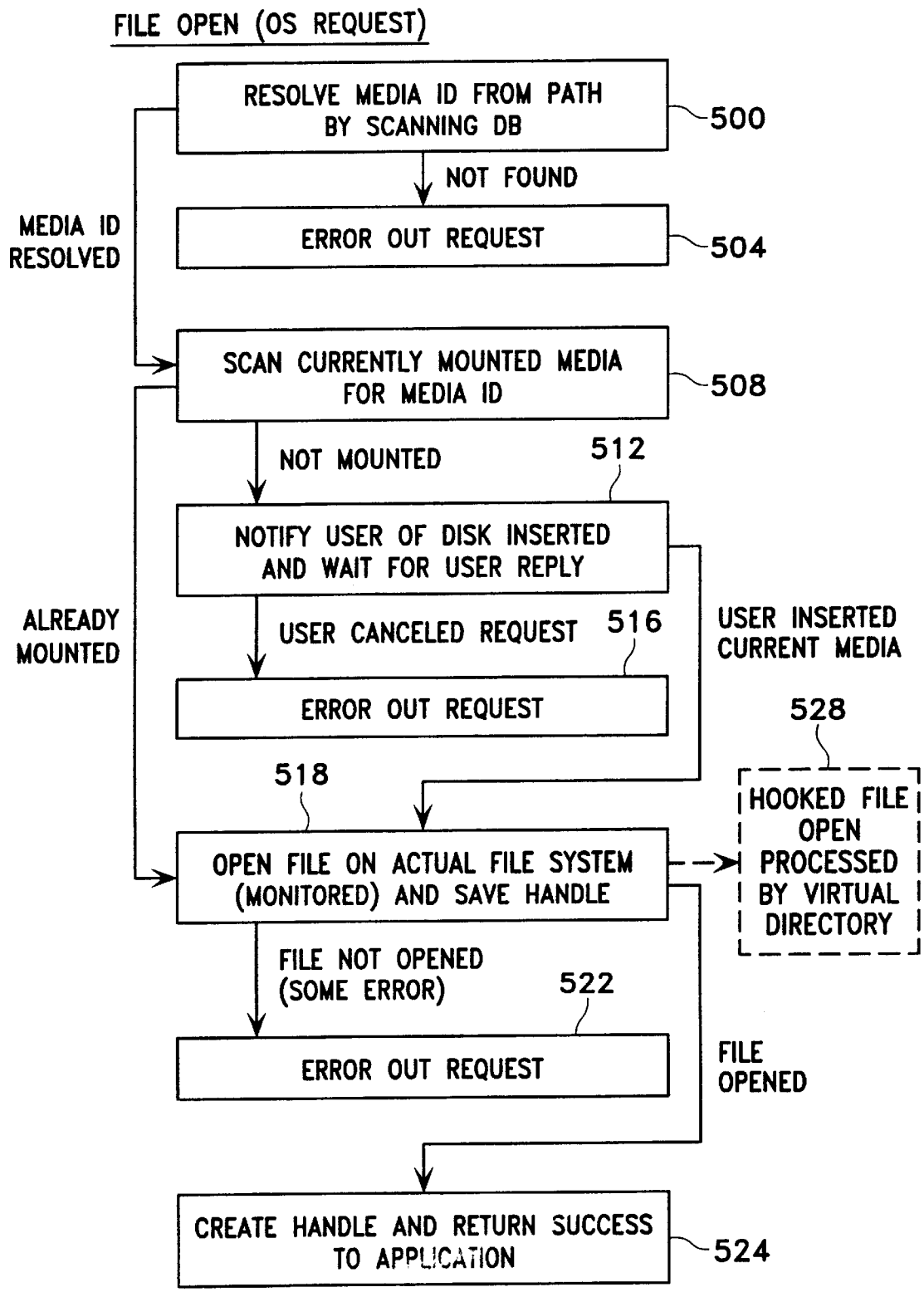
FIG. 5—Shows a sample flow diagram for a file open request that can be implemented by Windows 95.
Figure 7:
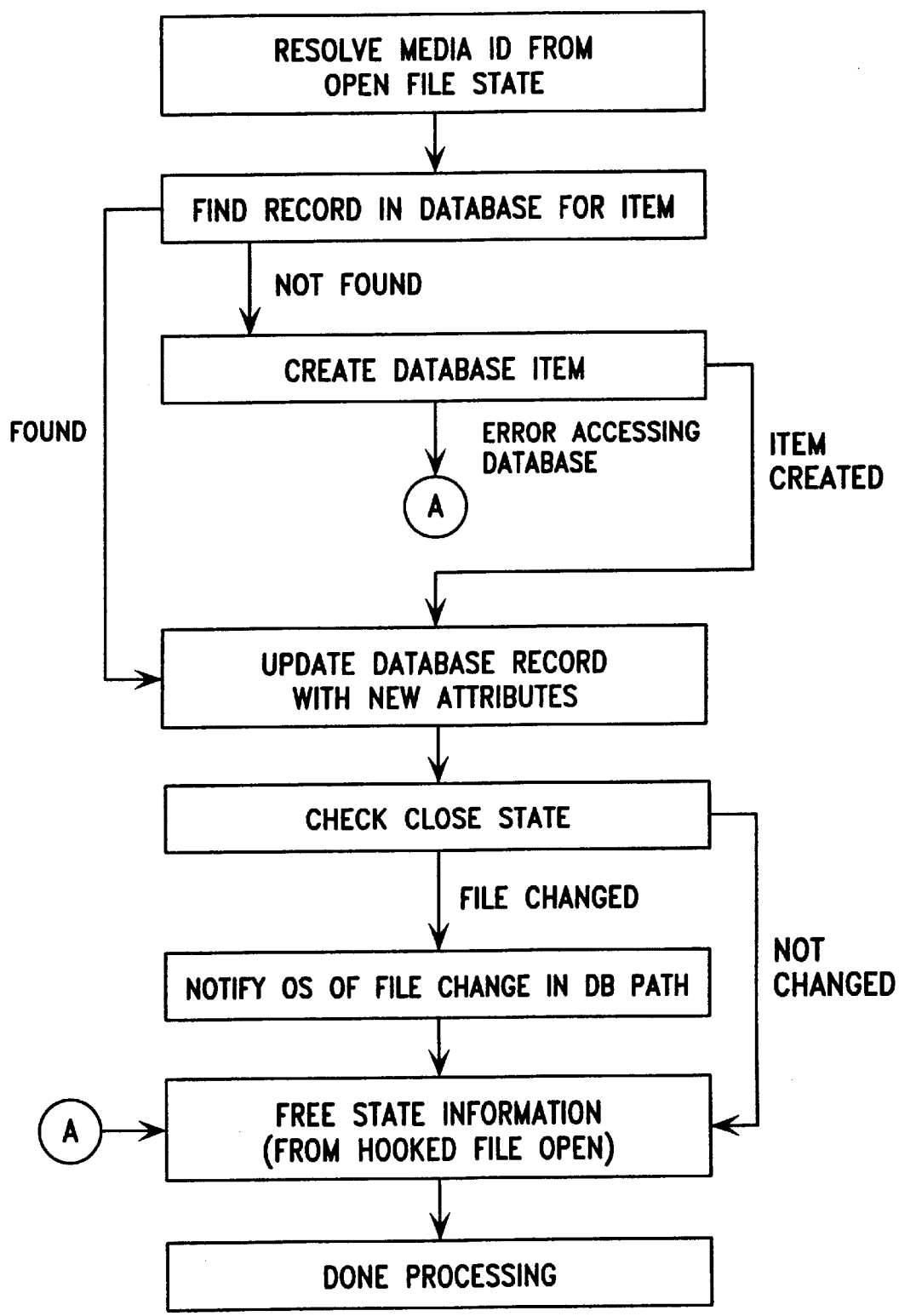
FIG. 7—Shows a sample flow diagram for file hooked by an interceptor and the update of the virtal directory database (DB) with file information, applicable for a Windows 95 environment.

As additional examples of an implementation of the virtual directory system's use in receiving typical I/O commands from operating system utilities or application programs, reference is made to FIG. 5 and FIG. 7 where flow diagrams for example Windows™ 95 based programs are shown. In FIG. 5 a Windows™ 95 File Open request from the operating system is being processed. The virtual directory system resolves the storage media ID from the file Path by scanning the virtual directory system database (500). If the selected media is not found in the database, an error message can be generated back to the user via an application program pop-up screen. If the media is found in the database, the physical storage devices are then scanned to ensure the desired device is presently connected to the system (508). If the desired device is not connected, for example a ZIP disk missing from a ZIP drive, the user can be notified of need for new disk (512)—furthermore a disk eject command could be used to eject an improper disk. If the incorrect media is connected in response, additional error signals can be generated (516). Once the appropriate media is installed, the virtual directory system can itself issue a File Open request back through the Installable File System Manager of Windows™ 95 via the representative dashed line interface (201) shown in FIG. 1. This File Open Request is processed by the physical storage device Filesystem and unless an error occurs (522), a file handle is passed back through the Installable File System to the virtual directory system which is then saved by the virtual directory system (518). The virtual directory system then assigns its own unique handle to the file, and sends that back to the application program or system utility which requested a file open of the virtual directory system (524).

Figure 6:
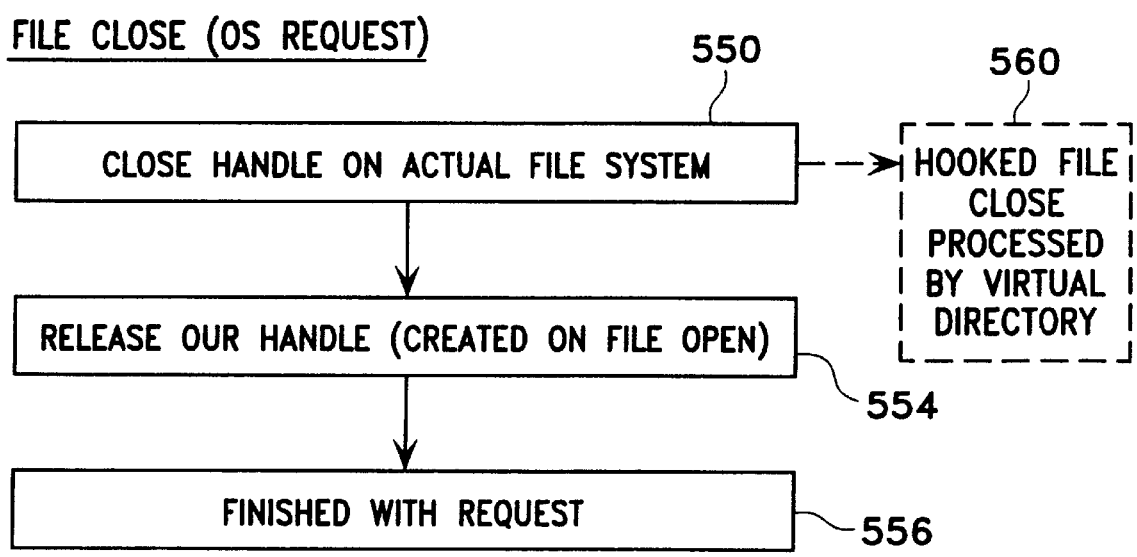
FIG. 6—Shows a sample flow diagram for a file close request that can be implemented by Windows 95.

Similarly, in FIG. 6, an embodiment for Window 95 can be used to process a File Close request from the operating system. Upon receipt of the command, the unique file handle associated with the virtual directory system is used to look up the actual file handle for the physical file storage device. Then, the virtal directory system generates its own Close File request to the Installable File System with the actual file handle. This command is carried out by the native file directory (550). Then, upon completion the unique file handle associated with the virtual directory can be released (554) at which point the virtual directory system is finished with the Close File request (556).

Interestingly, the virtual file directory system can exist as code that makes calls back into the I/O system to access as storage medium, such as a local hard drive, where the database can actually be stored in database storage space (9) on the storage medium. In Windows™ 95, for example, the virtual directory upon receipt of a desired file would first make a call into the installable file system to request the virtual file directory database stored on a hard drive, for example. Then, the physical storage location of the desired file could be returned through the installable file system to the virtual directory system Upon receipt of the physical directory storage location, the virtual directory system could implement its own file read command back to the installable file system, as described above.

With a virtual directory system, the user (e.g., a computer operator operating the computer system) has the ability to monitor the native file directory system for new information to add to the virtual directory system. Such new information might be new files saved to the native file system, revisions made to existing files on the native file system, application programs accessing particular files, or essentially any change processed to the native file directory system.

Figure 8:
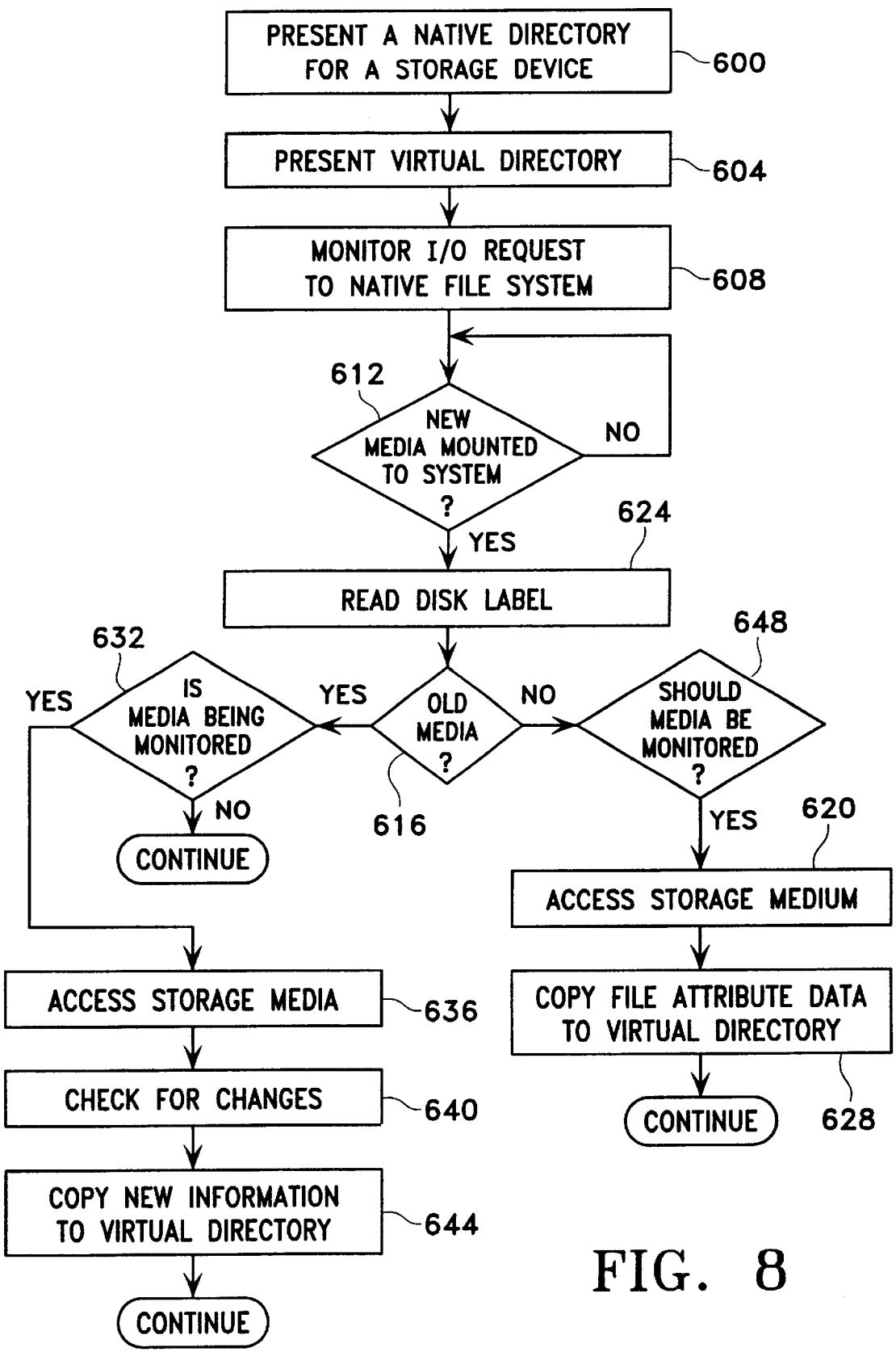
FIG. 8—Shows a sample flow diagram for monitoring mounting of media to a computer system and accessing file information stored on the storage media.
Figure 10:
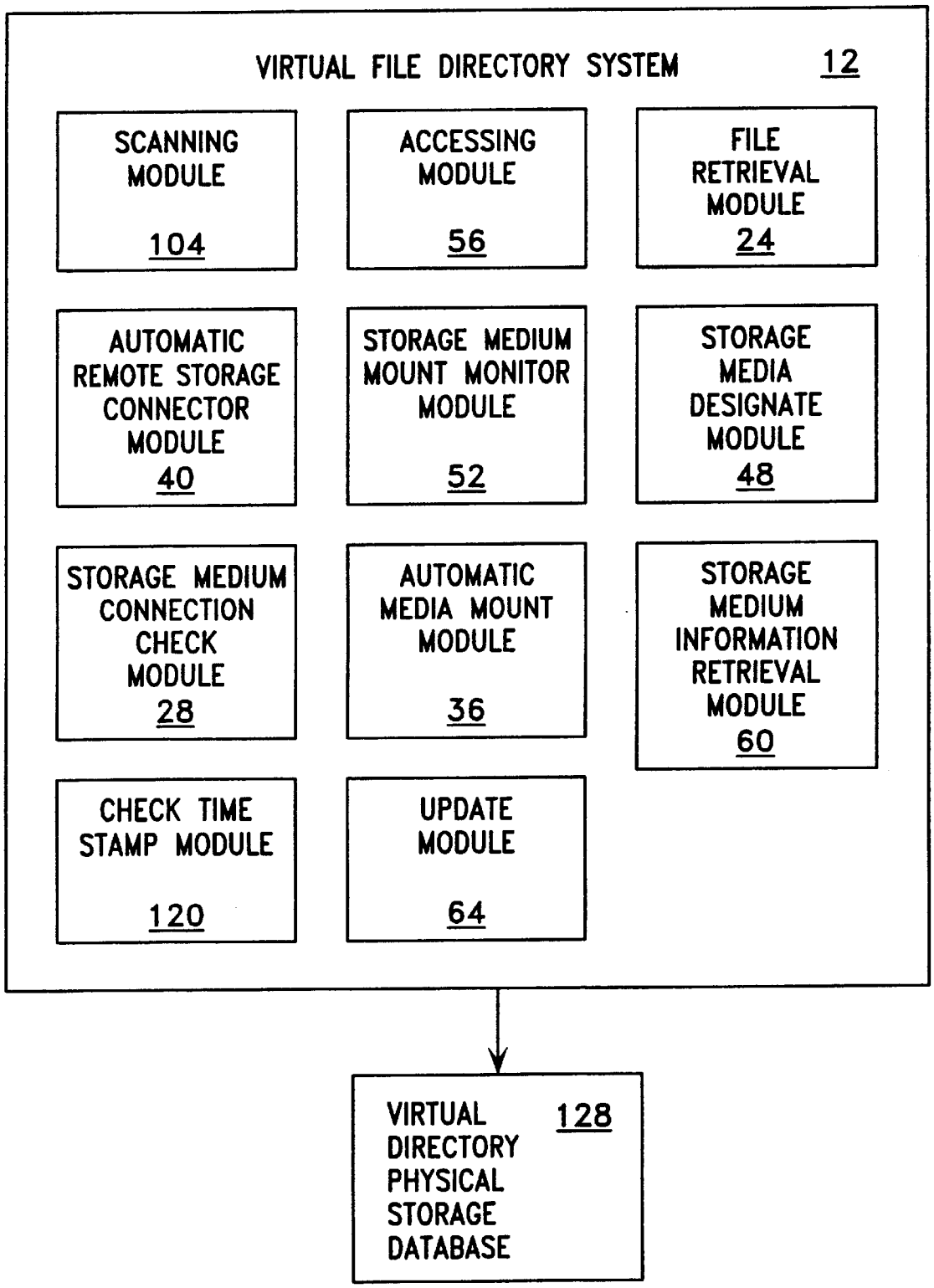
FIG. 10—Shows a possible configuration of a virtual directory system and the program modules that can be used to implement the system as well as a virtual directory physical storage database.
Figure 11:
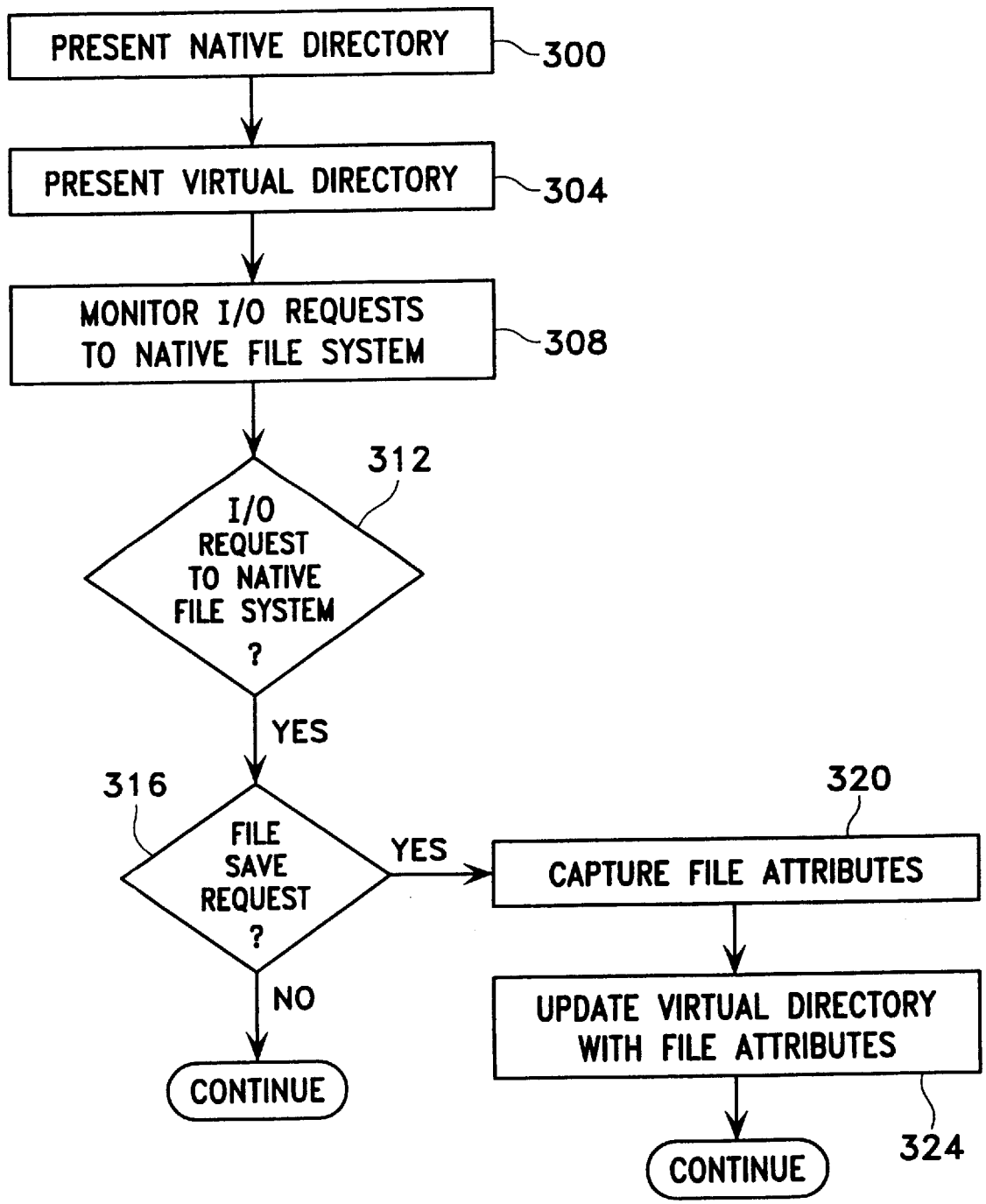
FIG. 11 shows a flowchart for one possible method of updating a virtual file directory when files are saved to a native file directory.

As shown in FIG. 8, one possible embodiment of updating a virtual directory file system can be seen. First a native directory of storage devices can be presented (600). A virtal directory can also be presented (604). A monitoring step can be implemented to monitor the input/output system (I/O) of the computer system with an interceptor for new media mounted to the system (608). This process is often referred to in the art as hooking the I/O system for the mounting of new media If new media is detected (612), the disk label of the newly mounted media or other identifier for the media used by the computer system can be read (624) newly mounted media can be checked to see if it is known by the virtual directory system (616). If it is not known (old media) and the media is supposed to be monitored (648), then the virtal directory system can access the new storage medium (620), and copy the file attribute data for the directory structure to the virtual directory (628). If the media is known to the virtual directory, the virtual directory can determine whether the computer operator even cares about monitoring the media. Perhaps the media is a floppy disk where inconsequential files are stored and which the computer operator does not wish to monitor. If the media is not to be monitored (632), the virtual directory can simply return to monitoring for other newly mounted media or other tasks. If the newly mounted media is being monitored, the virtual directory system can access the storage medium (636), check or look for any changes to the file attributes in the directory structure as compared to such attributes in the virtual directory system database (640) and update the virtual directory system with any new information on the storage medium file structure by copying, for example, the new information to the virtual directory database (644). Program code modules which make up part of the virtual directory system code or application programs called by the virtual directory system can be used as: a designator element which designates a particular storage medium (48), a monitor element which monitors for a mounting of a particular storage medium (52), an accesser element which accesses a mounted storage medium (56), a retrieve element which retrieves information (60), and an updater element which updates a virtual directory (64) shown in FIG. 10.

In addition to its use in monitoring for changes made by way of the addition of storage media to the computer system, the virtual directory system can also be used to monitor for changes made to the native file directory system in the form of changes made to existing files stored on the native directory system and the saving of new files to or deletion of existing files from the native file directory system. In this mode of use, "changes" is intended to mean changes to any of the file attributes of an existing file or the creation of a new file. Furthermore, the virtual directory system can act as a safety file backup program to store files that have been deleted from the native file directory system, in case those deletions are later regretted.

Figure 9:
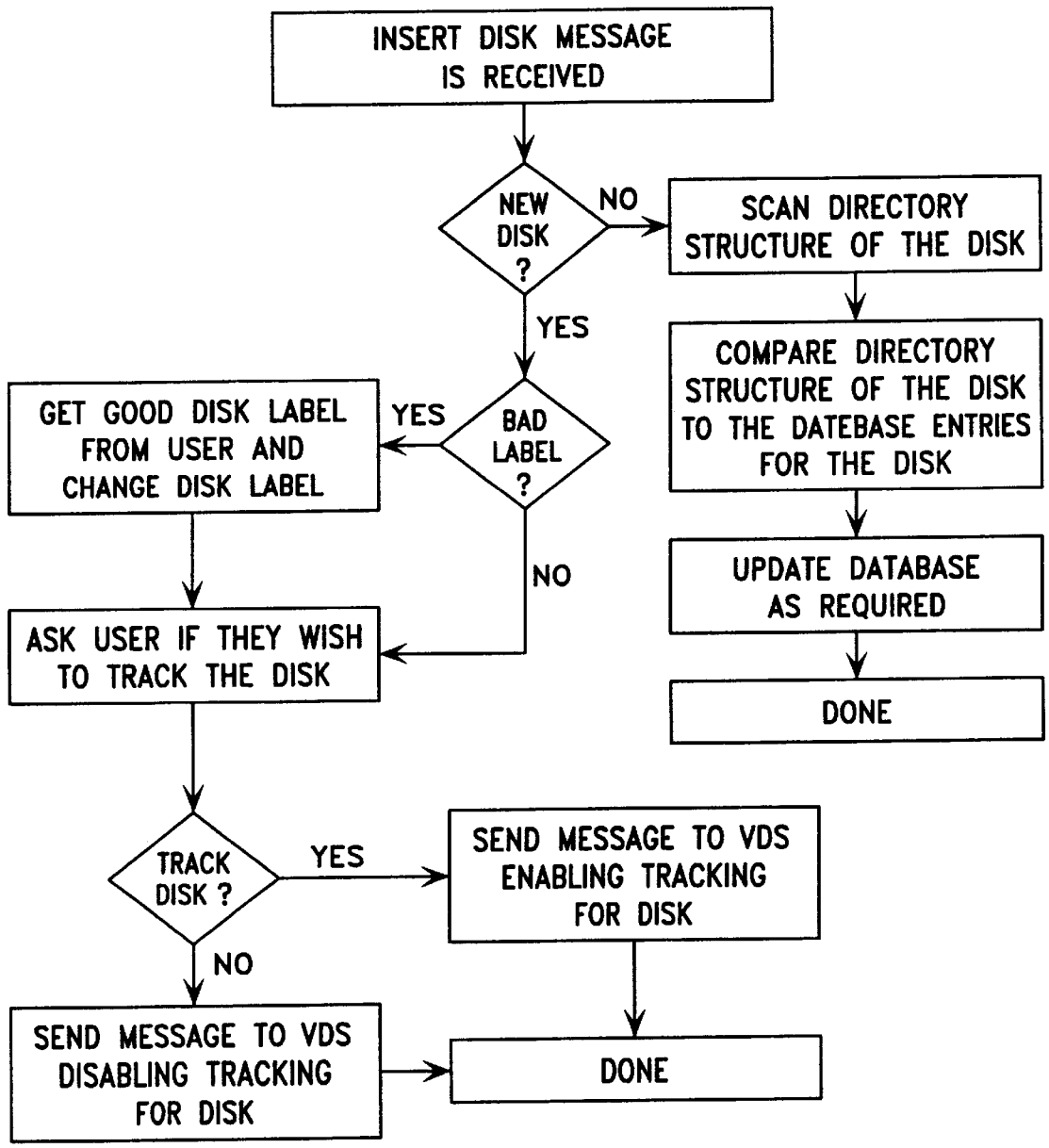
FIG. 9—Shows an alternative sample flow diagram for monitoring mounting of a storage device to the computer system and tracking of the device to update a virtual directory system (VDS).
Figure 12:
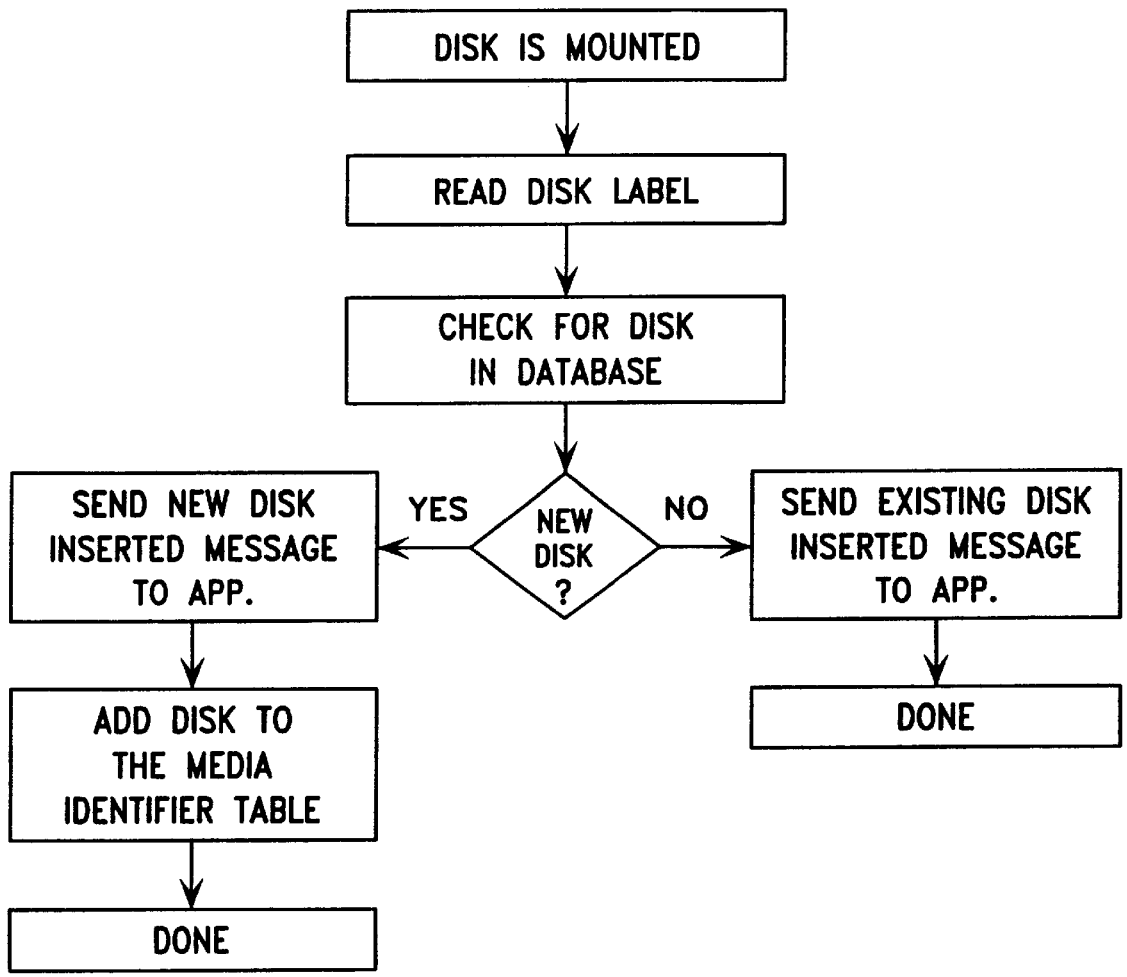
FIG. 12—Shows a flowchart for an alternative implementation of the monitoring for the mounting of a storage media to the computer system, especially for a Windows 95 implementation.
Figure 13:
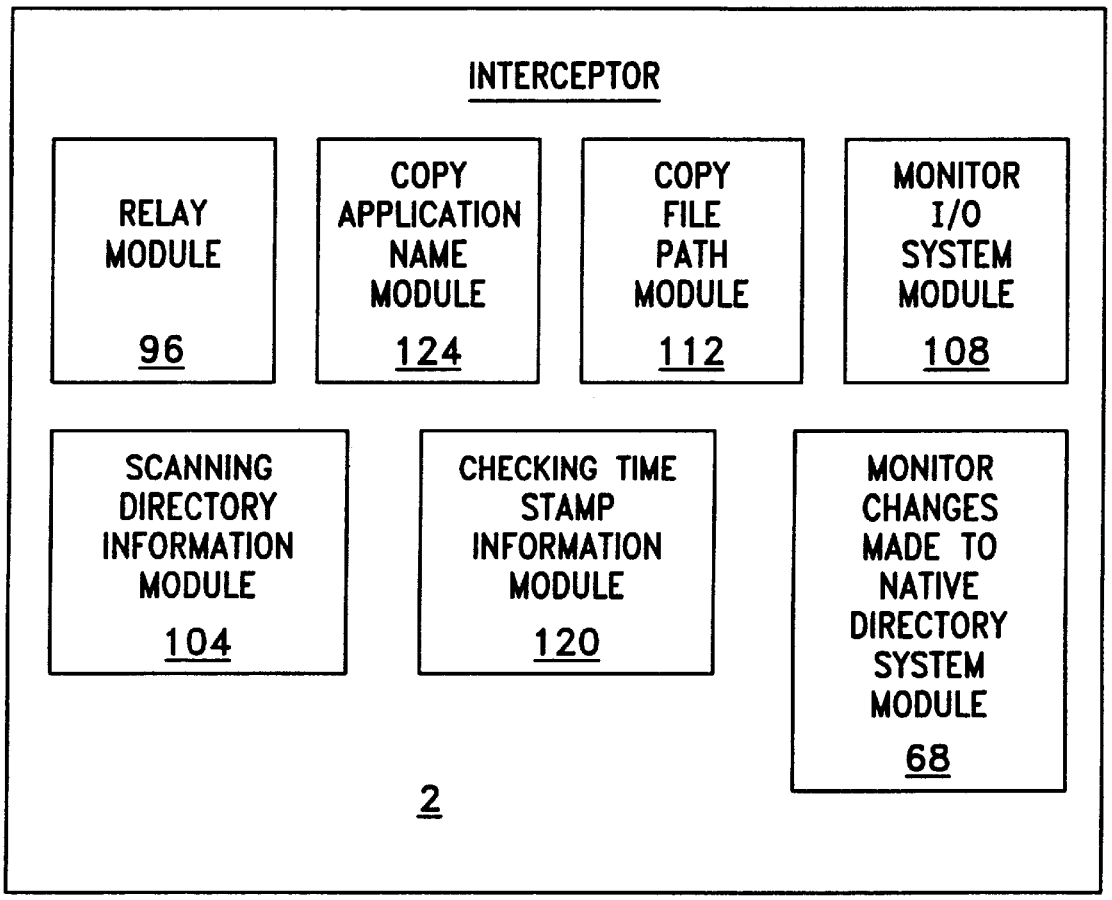
FIG. 13—Shows a possible configuration of an interceptor and the program modules that can be used to implement the interceptor's functions FIG. 14—Shows a sample flowchart for an implementation of monitoring a file system open request, applicable for the Windows 95 environment.

FIG. L shows a flowchart of one possible method of updating the virtual directory with new file information. A native file directory can be presented (300). Such a native file directory will typically be hierarchical in nature. A "hierarchical directory is intended to mean a directory with a rigid structure of file attribute information, the structure of which cannot be reconfigured after its selection. For example, a hierarchical directory could be comprised of a number of segment types arranged in a hierarchy, commencing with the root segment type; below the root segment type there is zero, one, or more segment types at the first level, with a similar structure below each of these first level types at the second level, and so on. Thus each segment type is dependent on a segment type at the immediately higher level. As an additional example, the typical structure of one's C: hard drive is envisioned as displaying drive name/ directory/subdirectory/ . . . /file name. Whereas a non-rigid hierarchy would allow presentation of this information in other manners, such as file name(subdirectory/ . . . /directory/drive name. In addition, a virtual directory file system can be presented (304). Then, the I/0 system of the computer system can be monitored by an Interceptor (2) for input(output commands or requests to the native file system (308). If the Interceptor detects such a request, the virtual directory system can check whether it wants to track the change—which might be determined based on the target storage device of the request. If the request is to be tracked, the request can be checked to see if it is a file save request (316). If it is, then the file attributes being passed through the interceptor to the native file system storage device can be captured (or copied) (320) and passed to the virtual file directory in order to update the virtual file directory with the file attribute information (324), e.g., by storage as a new record in the database. If the request is a file read request, the interceptor could capture the name of the application program that originates the file read request and then use that information to update the virtual directory system. Several of these functions might occur from the virtual directory system itself or might also be accomplished by the Interceptor independently. FIG. 13, for example, indicates that the monitor element which monitors changes made to the native directory system (68) could be comprised of a code module that is part of the Interceptor. Indeed, for some embodiments, the Interceptor could be considered a component of the virtual directory system. FIG. 7 shows a Windows 95 implementation of hooking file information and updating a database. FIG. 9 and FIG. 12 show alternative implementations of the file and media monitoring functions, for example, for a Windows 95 implementation.

One application of the virtal directory system would allow it to be used as a backup system. In this manner when the virtual directory system was informed that a file was about to be deleted from the native file directory system, the virtual directory system could actually copy the data from the physical storage device where it was stored and copy it to a backup location (224). Then, the delete command could be completed. The file would appear as deleted from the native file directory, but would still exist in a backup directory on the virtual directory system. Then, at a later date if the user regretted deleting the file, the file could be retrieved by accessing this backup directory on the virtual directory system. The backup directory system would actually store the file on one of the physical storage devices—perhaps a tape backup drive. When a user wanted to empty the backup drive on the virtual directory system, the virtual directory system could be accessed and a delete command issued for the file. Such a delete command could then be implemented as explained earlier for the open file and close file commands.

While the earlier discussion has indicated that the virtal directory system can make calls from the operating system or kernel level back to the application level, the virtual directory system could also be configured to make a direct connection to physical storage devices. The virtual directory system could implement the same interfaces provided by the file system driver components that support the physical storage devices. In this manner, the virtual directory system could be used by all application programs and operating system functions in a manner consistent with that of physical storage devices. As those of ordinary skill in the art would readily understand, the virtual directory system may provide functions such as open volume, read data, write data, seek delete volume, rename volume among others, in a manner that is consistent with physical storage devices for the given native file system. The virtual directory system can also provide the common attributes associated with a hierarchical directory system such as the parent/child/sibling relationships associated with physical storage devices, directories, sub-directories and files. This implies that the virtual directory system may also support find first and find next functions associated with traversing hierarchical directory systems. FIG. 17 shows a possible record structure that the virtual directory system may implement to provide the services that are expected by the native file system. As discussed earlier, when a user does request access to a file that they have selected from the virtal directory system the virtual directory system may return a file handle in response to the file open command. However, before the file handle is returned for the user request, the virtual directory system may need to call or send a message to the interceptor module so that the requested file can then be opened on the physical storage device that contains the actual data. This sequence of events may be observed to ensure the file is indeed accessible on the target device and to take the necessary steps to load the appropriate media should it be off-line. Once the file handle is returned, the virtual directory system and the interceptor may then become a pass through device between the physical storage device and the various requests of the user.

The implementation of the virtual directory system should be straightforward once the basic principles as explained above are understood. For example, the virtual directory system may also be implemented as a file system driver or drivers. It may incorporate a database comprised of all or some portion of the file system name space descriptors. When used as a virtal access location, it may serve as a control for the interceptor. In this mode the global system may cause the interceptor to respond to standard file system commands to initiate actions involving a physical storage device. For example, if the virtual directory system received an "open file" command, it could in turn (via the Interceptor's Ioctl or other such interface) make the interceptor issue the command to achieve the action. As one of ordinary skill in the art could easily implement without undue experimentation, since the virtual directory system could emulate a physical storage device at the driver level, any application could perceive it as an actual storage device and could program the overall system to function as usual. Further, since the virtual directory system's information could be configured as a database system, access and utilization of the information of the virtual directory system could be achieved through well-known database programming techniques without undue experimentation.

As noted earlier, some of the capabilities of this parallel virtual directory system which can provide parallel information of a native directory system aspect of the invention may include providing the ability to connect to the native operating system's file system interface in a manner similar to a block device, such as a hard disk. It may allow read/write access to all virtual files. In addition the system may utilize database technology to allow gross manipulation of the information in a gross manner to permit reorganization, recharacterization and other appropriate handling or presentation of the information. It may also present to the native operating system a directory structure that is composed of entries gathered via the Interceptor module(s), and may present to the system user a virtual file system representative of all files contained within the native file systems. The virtal directory system may provide a secondary interface so that application level programs may configure its database so that multiple views of the global system may be created. Through an ability to present multiple views, it may export those views to the operating system's file system interface in such a way that the views are presented to the end user as discrete logical devices via the native file browsing mechanisms. In utilizing its database capabilities, the global system may organize lists of files that meet predefined, or user defined criteria and may provide these lists of files on demand to Information Management Processes (IMPs) to more efficiently carry out data management processes. It may also allow the end user to access any file in the computer system, either directly through the native file system, or indirectly through the parallel virtual directory system.

Furthermore a goal of the system may be to organize the end user's data and to make it easier to manage the data for backup, archiving or other data management processes. The heart of the system in this regard could be the Parallel Virtual directory system. This system may be a database that could be used to track the state of every file in the system. This could be accomplished by accessing an installable file system (such as the Windows™ 95 Installable File System) to monitor changes to any file in the system. This could include data on removable media as well as the hard disk.

One of the advantages with a design such as the global system could be the use of a persistent memory. With the popularity of Zip drives and DVD drives, end users could have a huge amount of data on disks that aren't mounted in the system so, as fir as the normal file system is concerned these files don't exist. With a persistent file system such as might be configured, the computer system could remember that the files exist and on which piece of media it is located. In this fashion, an end user could always find any file even if the disk were not loaded. If they requested the file through a persistent system, then the invention could act to tell them to mount the required piece of media. This same process can work for files on tape or that you might store at an Internet storage site.

It should be noted that many of the functions and apparatus demonstrated in the figures in this patent may be interchanged to suit a particular embodiment of the invention.

As noted above, the virtual directory system can utilize an interceptor apparatus to detect changes that occur in the native file directory. Such changes might involve the connection of new media to the computer system, the input and output commands for files stored on the native file system, as well as many others, such as the application program originating a request for a file.

In one embodiment of the invention, the interceptor can be inserted between the operating system interface to the physical storage devices and the physical storage devices themselves. This might be visualized as a single interceptor (2) module as shown in FIG. 1 or as separate interceptor modules (2) for each storage device as shown in FIG. 2. The interceptor module can be programming code that receives an Input/Output command from the I/O interface and determines from that command whether the interceptor (or its master, such as the virtual directory system) is interested in the information being input to or output from the native file directory. The Interceptor (2) might even be used to initiate its own command to check system flags, interrupts, or system status, when the I/O command is received. In this manner, it could be used as an intelligence gathering or error checking device for a system. If the interceptor is interested in a command, it can then relay the information to its master, such as a second file directory system (88) like the virtual directory system. Such information might include the name of the application program that sent a command or request, or file attribute information (16) for a file. This information could then be stored in the second file system. As shown in FIG. 13, such processes could be accomplished by programming code that acts as: a monitor element which monitors input/output (108), a relay element which relays intercepted information (96), and a capture element which captures application program name (124).

Additionally, or as a separate embodiment of the invention, the Interceptor (2) could be used to monitor for the attachment of storage media that was either reconnected to the computer system or which was newly connected to the computer system. If there were such a desire, the Interceptor could even be used to monitor when media was removed from the computer system. This process can be understood by reference to FIG. 8 which was discussed earlier. For example, it can be used to check the new media for any new information that should be added to the virtual directory system. This might be accomplished by accessing the directory structure of the new media, scanning for any new information (i.e. traversing and comparing to the data in the second file system) and relaying the data. Program code modules as shown in FIG. 13 could be used to accomplish the scanner elements which scans (104), monitor element which monitors I/O requests (108), copier elements which copies file path information (112), relay elements which relays information (96), and checker element which checks time stamp information (120).

Figure 14:
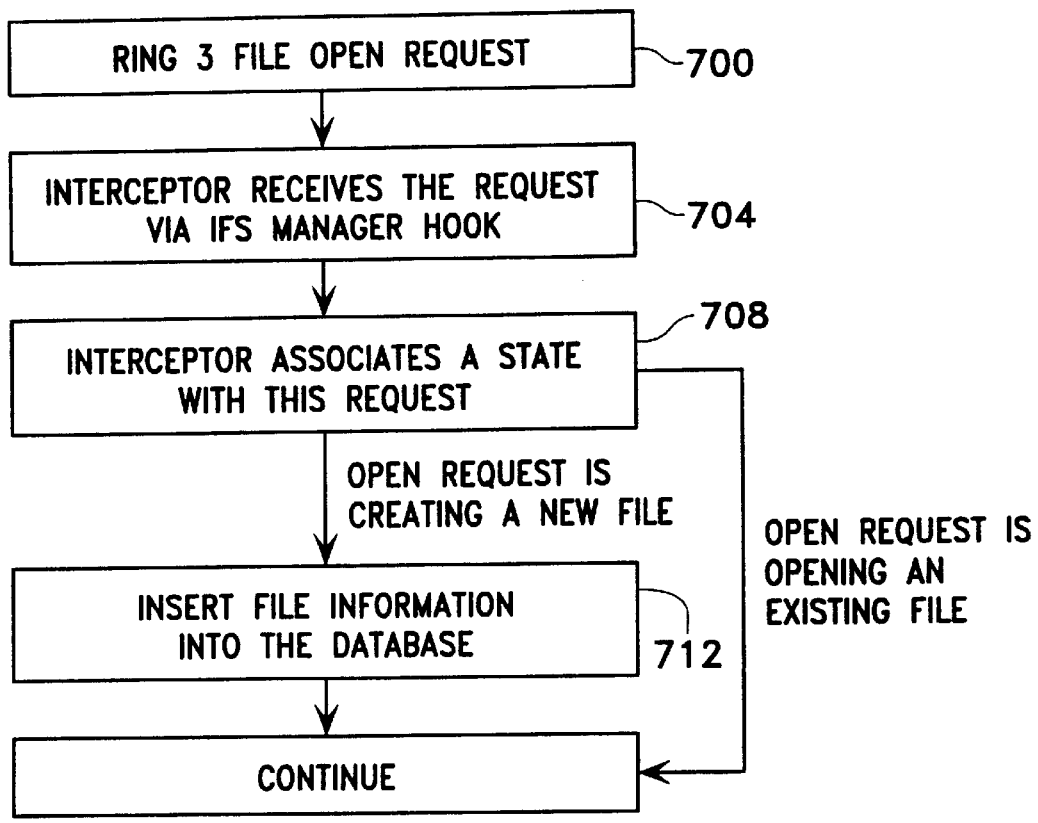
Figure 15:
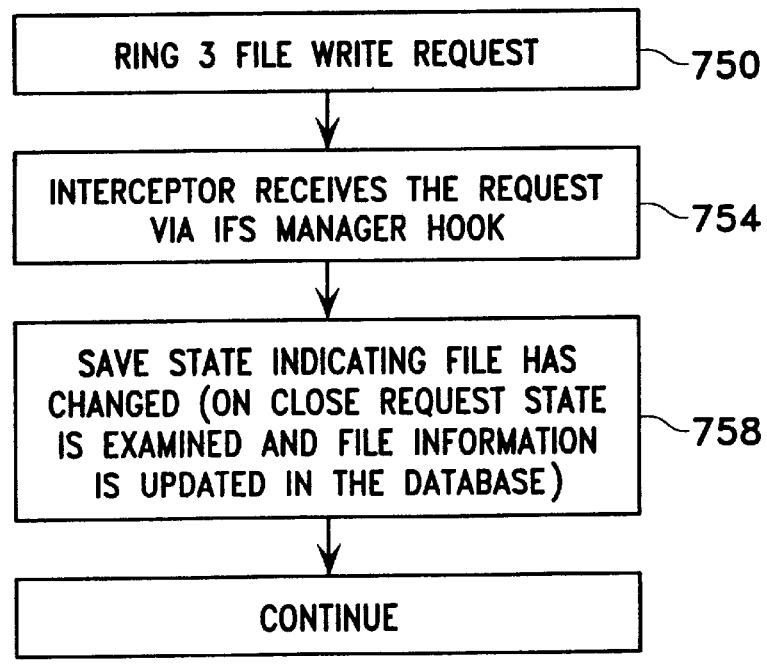
FIG. 15—Shows a sample flowchart for an implementation of monitoring a file system write request, applicable for the Windows 95 environment.
Figure 24:
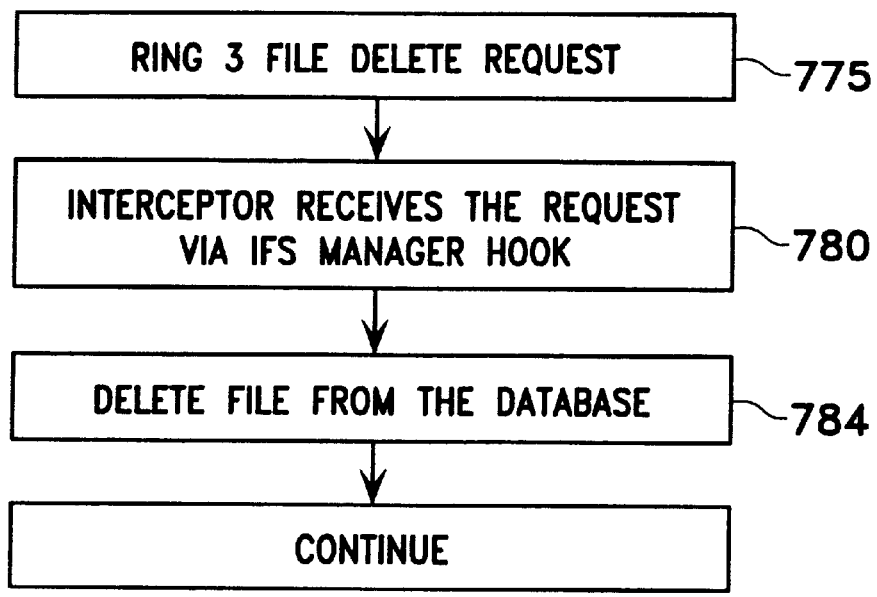
FIG. 24—Shows a sample flowchart for monitoring a file system open request as might be implemented in a Windows 95 environment.
Figure 25:
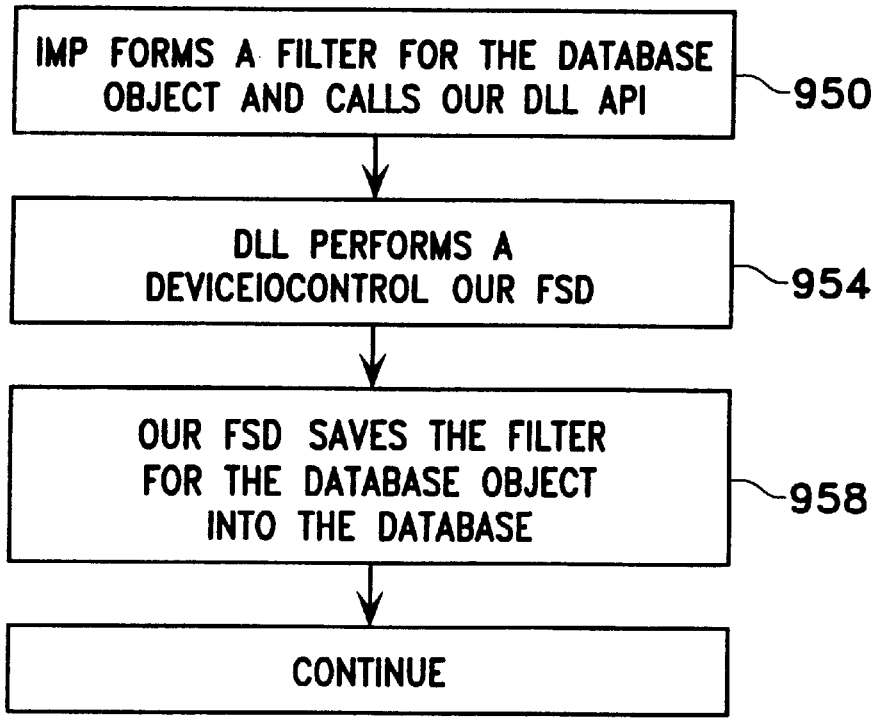
FIG. 25—Shows how a sample flowchart of how an information management process (IMP) might reconfigure a virtual directory system.

FIG. 14, FIG. 15, and FIG. 24 demonstrate some ways in which an Interceptor module can be utilized in the Windows™ 95 environment. In FIG. 14, a procedure for monitoring of File System Open requests is shown. First, the application program makes a Ring 3 (an application level request in Windows™ 95) request to open a file (700). Then, the interceptor receives the request (704) as it is located as shown in FIG. 2 between the Installable File System Manager and the Filesystem Device Driver. (The use of the interceptor in this manner is often referred to as hooking the I/O.) The interceptor can then associate a state with this request (708) and either open an existing file or create a new file. If a new file is being created, the file information sent with the open request can be inserted in the database (712). In FIG. 14, a procedure for monitoring of a File System Write request is shown. The application program makes a Ring 3 write request (750) and the interceptor receives the request via the IFS Manager hook (754). Then a save state is made indicating the file has changed (758). When the close request is received, the state is examined and the file information is updated in the virtal directory system database. In FIG. 24, a procedure for monitoring a File System Delete request is shown. The application program makes a Ring 3 File Delete request (775). The Interceptor (2) receives the request from the IFS Manager hook (780). The file is then deleted from the database (784). However, as noted earlier, the file can be backed up on a virtual directory system, as an alternative prior to deletion.

For exemplary purposes, alternative configurations of the interceptor module could be used. For example, the interceptor apparatus may be composed of several modules as noted earlier. The interceptor apparatus may reside at the application and file system interface. Its purpose can be to intercept file open, read, write and delete requests from application programs and system utilities. When these requests are intercepted, the file path information may be copied from the request and relayed along with the physical device target information via procedure call or system message to the virtual directory system. Often, it can be critical that the request is intercepted at a level where the user defined names are present and before the file system translates the request into an internal file handle. This can be necessary so that the user defined names can be stored and later presented when the virtual directory system is accessed.

As another example, the interceptor module may reside between the installable file system and the file system driver. The purpose of this module may be to detect when media is changed in a removable storage device. This may be done by polling the device or detecting media change messages from the file system driver, as well as any other means available. This module then may mimic system calls normally implemented by the installable file system to extract directory information it from the newly inserted media. This module may read the media label and may query the virtal directory system to see if data regarding this media has been previously recorded within the virtal directory system If the directory information contains time stamp information this may be checked against the last recorded information for the particular media and if the time stamp indicates that the media has not been altered since the last insertion then the step of actively extracting the directory information from the disk may be omitted.

The interceptor modules may be used to extract directory information from the physical storage devices in a manner which is transparent to both the user and to even existing application programs. An interceptor module can be used to provide read and write or other such access to the file data contained by the physical storage devices. This function can be necessary to allow the virtal directory system to emulate a physical storage device. When the user or application programs request to read or write file data via the virtual directory system, the virtual directory system ideally may provide a virtual connection to the physical storage device that the data is located on. The interceptor module can emulate, in the case of Windows™ 95, functions provided by the installable file system. The module can implement the protocols for read/write operations to the file system driver associated with the target physical device. In most operating systems this interceptor module can be used in lieu of the standard file system interface due to reentrancy problems commonly encountered when operating system driver level components attempt to call into the application level interface of the operating system Naturally, the system could automatically alter its signals to mimic or emulate the type of storage device expected to be operated and thus act without any apparent impact on the user or those applications utilizing such signals.

Some of the capabilities of the interceptor aspect of the invention may include providing that the Interceptor module (s) may capture changes to files on a plurality of fixed, removable or remote storage devices and relay the names of the files changed and the nature of the file changes to the virtual directory system or the like. The Interceptor module (s) may also detect the type of application program that originates the file changes and relay the application program type along with file names and types of changes. Similarly, the Interceptor module(s) may identify the type of file data stream and extract class unique file metadata and relay this information to the system. It may allow the system to extract a data stream from a plurality of fixed, removable or remote storage devices and allow the system to write a data stream to a plurality of fixed, removable or remote storage devices, and reflecting these changes in both the directory structure provided by the virtual directory system and the directory structure provided by the native file system. It may also detect when new removable media has been mounted and without user intervention relay the directory on the media to the virtual directory system and update the system to the current state of the removable media.

As one additional example, the Interceptor may be a series of routines which achieve the desired functions. These could include a "means for sensing a change event" or a sensor which might be any device, wiring, or program subroutine that monitored (via a monitor) the various signals present and constantly tested them to see if they were of a character that indicated a change or other appropriate event might be occurring. Thus the means, might be a change sense routine or even hardwired change sensor circuitry. As those of ordinary skill in the art would readily understand, this change event sense routine might use the Ioctl interface (for Windows™ 95) or other such interface to achieve its goal. Once a change event occurred, the change event sensor or change event sense routine might activate a data capture routine which could then provide input to a data store means or routine. This data store routine might access an allocated memory on any one of the memory means of the computer. Preferably the memory element accessed would be a non-removable type of memory (such as the hard drive) which would always be available. Similarly the interceptor or intercept routine could provide a response or signal capability to allow the application or user to obtain the desired item. This capability might consist of a signal generator or signal generation routine as those of ordinary skill in the art would readily understand.

The native file system usually provides access to various physical devices used for storage of data by the computer system. Application level programs usually rely on a consistent interface to file data within the context of a given operating system. In turn, the native file system of the operating system may expect a consistent set of services to be provided by the file system drivers for the various physical storage devices connected to the computer system. FIG. 2 shows a block diagram of the Windows™ 95 operating system and the elements that make up its current native file system. The role of the various interceptor apparatus described earlier can be to capture or inject data at the various levels of the native file system architecture for the purpose of monitoring or providing access to the data stored on the physical storage devices. The interceptor apparatus can provide these functions for the benefit of the virtual directory system.

The Interceptor might be created as a programmed module which serves as a file system driver or drivers. It might insert between the installable file system and the file system driver of the target physical storage device as a person of ordinary skill in the art could readily understand and implement using standard knowledge, textbooks, or routines. It might thus receive all standard file system messages intended for the physical storage devices, messages of interest to the virtual directory system, as well as those of interest to the target physical storage device.

Figure 16:
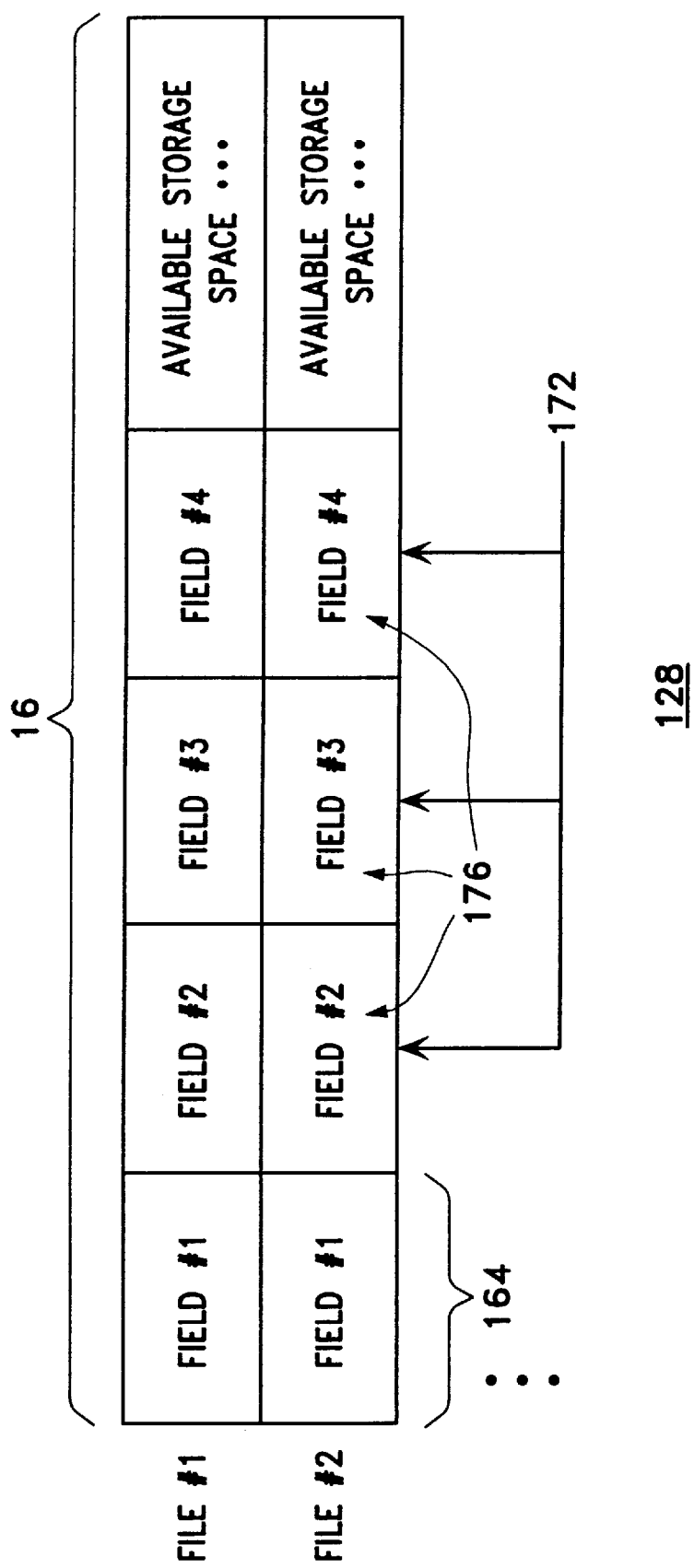
FIG. 16—Shows a sample database that shows the arrangement of file attribute fields containing file attribute data as well as additional storage space for future file attribute field data.

As noted earlier, the virtual directory system can utilize a configurable database (128) for storing file attribute data or information (16) about particular files stored on a native hierarchical directory system. A collection of file attribute data for a single file can be considered a set of file attribute data or a file record. As a matter of course, the database (128) will have a minimum number of file attribute fields (164) when it is first created. As indicated by example in FIG. 16, within each file attribute field for a file, file attribute information (16) can be stored. Such information would relate to the file which it represents and also relate to the parameters used to define that particular field.

Because the file information is stored in a relational database rather than in a rigidly structured storage system, it may easily be reconfigured by normal database operations. For example, if a new file attributes are desired to be added to describe a file, such an additional file attribute fields (172) can be added to the database in order to extend the information contained by the database to describe a file. Within the additional file attribute fields, additional file attribute information (176) could be added. An adder elements which adds a new file attribute to the configurable database (180) could be used to accomplish this and would typically be comprised of database code which operated on the database. Similarly, a deleter element which deletes a file attribute field (192) could be used to delete a file attribute field. Similarly, a selector element which selects a file attribute field (184) and a sorter elements which sorts the configurable database (188) could be implemented through program code to accomplish those functions and configure the database in a new arrangement. This versatility would then allow the database information to be rearranged, grouped or configured based on the user's commands.

For example a typical DOS directory is shown in FIG. 20. This directory is shown as an extended version in FIG. 21. An extended directory of information in the virtual directory file system designated as H: is shown in FIG. 21. This extended system has added a description field and three backup fields where files can be backed up when they are changed. Furthermore, the extended directory demonstrates that files can exist with the same file name in the same directory. The database can distinguish such files based on other file attributes such as time and date of creation or file size if it were configured to do so. Because the virtual database is separate from the native file directory, it does not destroy the native file directory system. Rather, the native directory system can be accessed as always; while the virtal directory file database can permit more advanced file access.

Within the context of a hierarchical directory system the parent/child/sibling relationships can be fairly rigidly defined. Both out of necessity, and the desire to provide organizational benefits, the virtal directory system can provide dynamic methods for defining parent/child/sibling relationships. For example, each record noted in FIG. 17 contains an entry for a physical storage device, therefore a given instance of a hierarchical directory that the virtual directory system presents to the native file system might be one that exactly parallels the data presently stored on a given physical storage device. That is, the starting point of the hierarchy might be that of physical storage device, so the directory tree would start with the "c:" hard disk for example. However, in the case of the virtal directory system the physical storage device might be used only as a uniqueness identifier at the bottom of the hierarchical directory tree. As a result, the virtual directory system may need to be adaptable in how the hierarchical tree is presented to the native file system. In order to overcome any uniqueness barrier which may be presented by the hierarchical directory system, the virtual directory system may actually present the file entity as a pseudo directory entry to the native file system, this is so that the date/time combination or the physical storage device might be treated as the file instance for the purpose of uniqueness.

As another example, a hierarchical directory path might be expressed as "c:\document\patentapp.doc". Within the native file system patentapp.doc is the entity that is accessed for the data. Imagine within the virtual directory system that it contains the path "c:\document\patentapp.doc" and it has a time and date associated with it of Nov. 1, 1996 12:01 p.m., just as it exit on the c: storage device. In this case, the virtal directory system may also have two other entries for this file because the user wished to ensure that there were multiple copies of this important document. The virtual directory system may also contain entries for "zipdisk1\document\patentapp.doc" with a date associated with it of Oct. 31, 1996 09:00 am., and another instance of "zipdisk2\document\patentapp.doc" with a date of Nov. 1, 1996 12:01 p.m. If the user wished to see all instances of .doc files the virtual directory system could then provide three unique paths to the file consisting of "\document\patentapp.doc\Nov. 1, 1996 12:01 p.m.\c:", "document\patentapp.doc\Oct. 1, 1996 12:01 p.m.\zipdisk2" and finally "document\patentapp.doc1\Oct. 31, 1996 09:00 a.m.\zipdisk1". Methods for converting time/date representations to suit the requirements for the native file systems path can, of course, also be tailored as needed. An important feature in this regard may be the virtual directory system's ability to dynamically resolve the uniqueness requirement of a hierarchical directory by altering the directory element attitudes that are presented to the native file system during the find first, find next directory query sequence.

Figure 27:
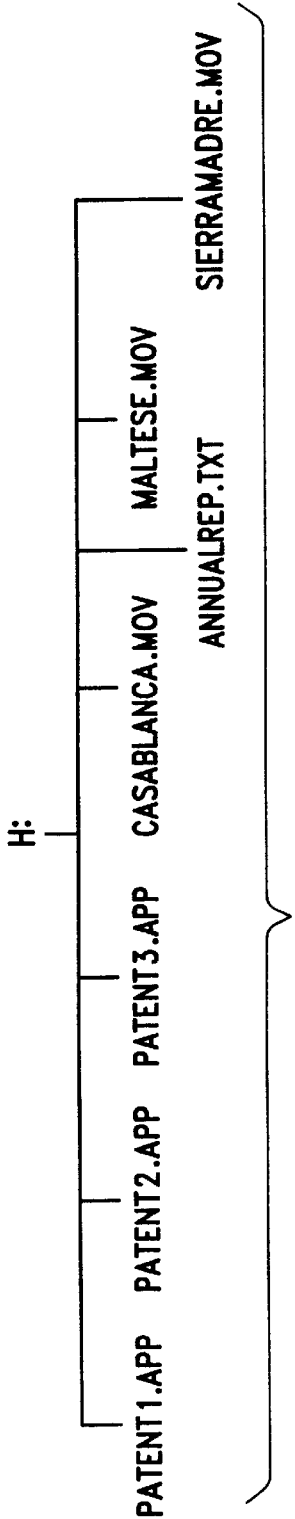
FIG. 27 show a directory configuration which displays all of the files in a virtual directory database as one directory.
Figure 18:
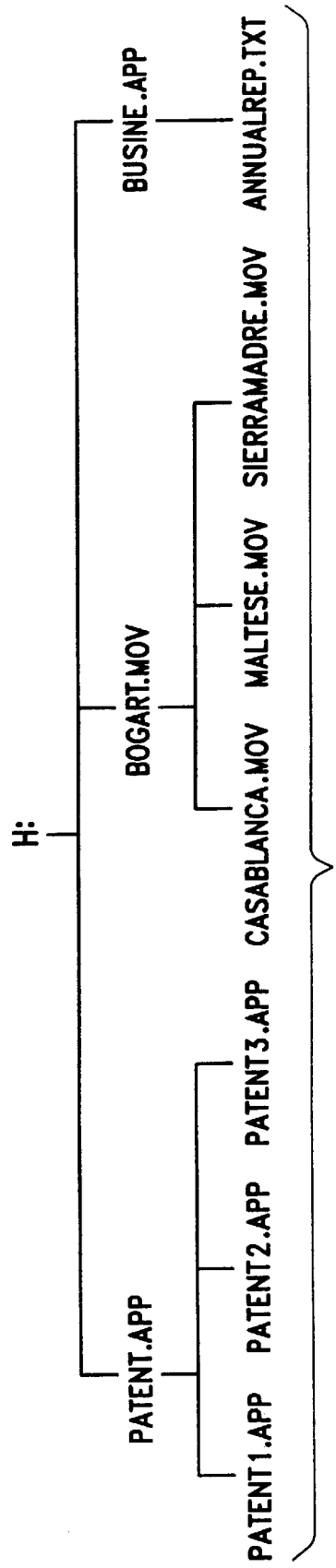
FIG. 18—Shows a directory structure for a virtual directory divided into subdirectories.
Figure 19:
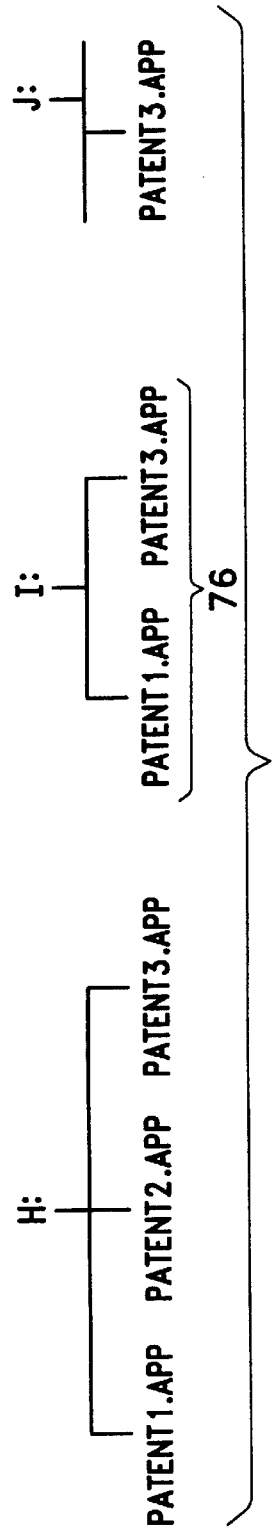
FIG. 19—Shows a directory structure for a virtual directory database configured to present three separate virtual directories.

As mentioned, since the global system could be configured as a database it could present to the user many different "disks" just by configuring a different view of the system. A user could look at files in the system at a certain point in time, or with a particular name, or files that you have deleted from the hard disk but are stored on removable media. This can be seen in comparing FIG. 27, FIG. 18 and FIG. 19. In FIG. 27, a directory configuration which displays all of the files in the virtual directory database as one directory is shown. In FIG. 18, subdirectories have been introduced to group files having common themes: patent applications, digital movie data, and business reports. In FIG. 19, three different virtual directories are presented. Furthermore, some of the files are presented in different virtual directories at the same time. For example, the one file with the filename Patent3.app is presented to the computer system in virtual directories H:, I: and J: simultaneously.

The use of a database to store directory information provides unique opportunities for a computer system in managing that database. While a standard I/O interface will typically support I/O commands between a virtual directory system and a computer system's I/O system, commands directed to configuring the virtual directory database or adding information will likely not be supported. Such commands can be originated by programs known as Information Management Processes (MPS). For example, in Windows™ 95, commands such as read, write, delete, open and close can be passed by the Installable File System Manager to the Virtual Directory Filesystem. However, a command to configure the virtual directory database, would not be supported by the File System Manager. Hence, a private interface is necessary for communication of such unique commands from an application program used to configure the virtual file directory system to the virtal directory file system itself The private interface can then transfer the unique command to the virtual rectory system Such an interface can be useful to not only configure the database, but also to input file attribute information such as the extended field information shown in FIG. 21. In the Windows™ 95 environment, one such private interface can be accomplished through use of the Windows™ 95 IOCTL command.

Figure 22:
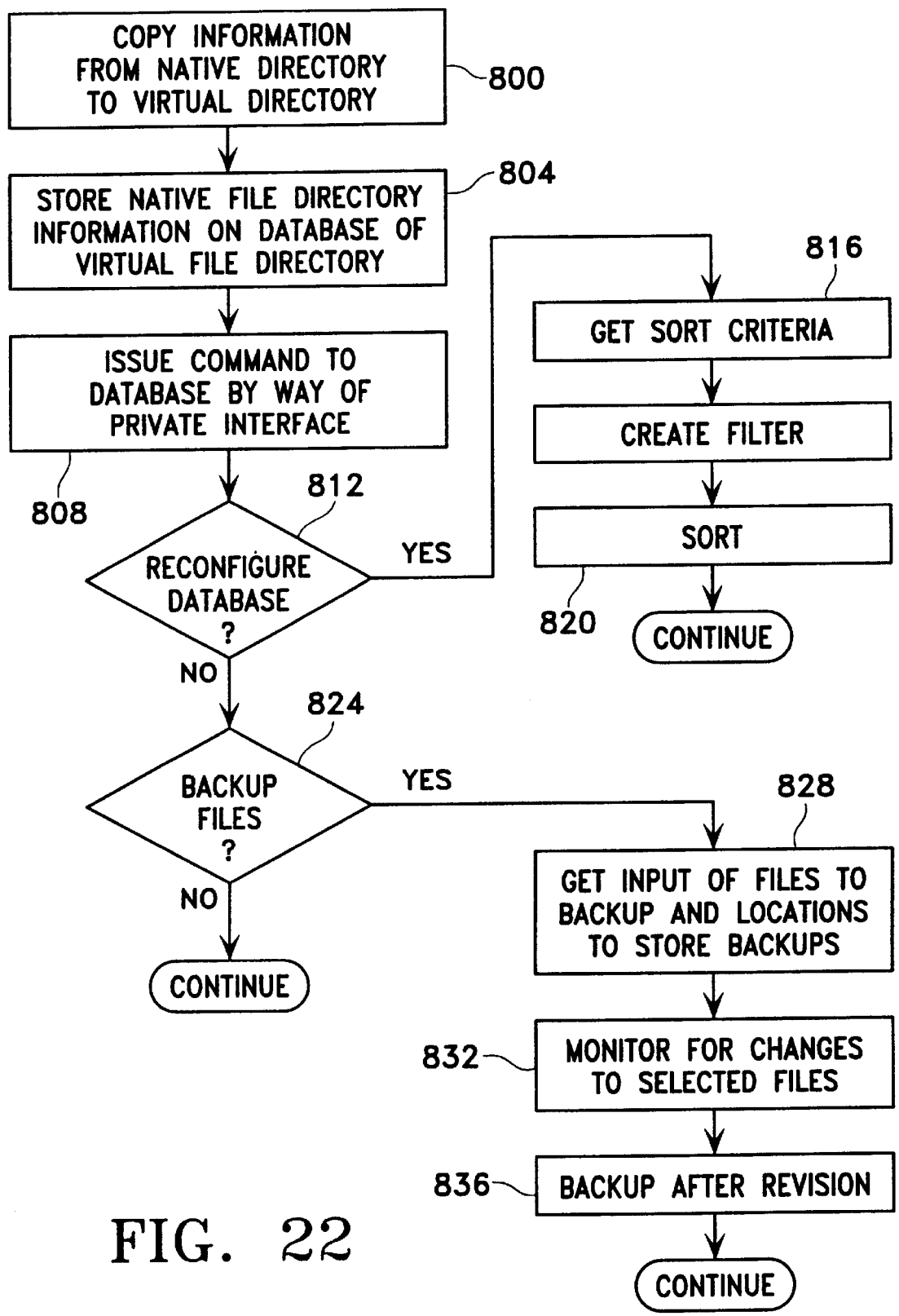
FIG. 22—Shows a sample flowchart for reconfiguring a virtal directory database as might be implemented by an information management process.
Figure 23A:
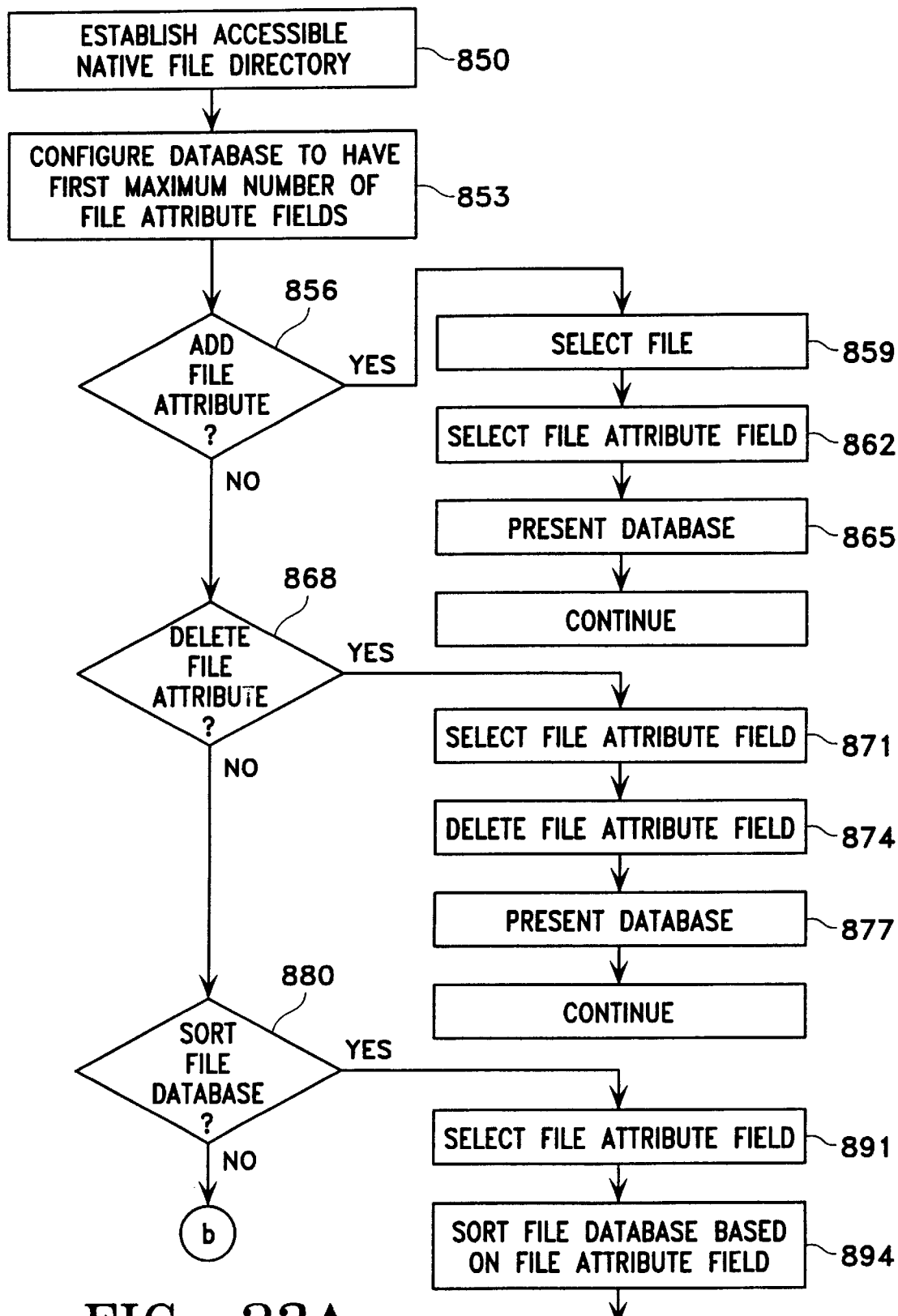
FIG. 23—Shows a sample flowchart for adding and deleting file attributes from a configurable file database of the virtual directory as well as a sort routine for configuring the virtal directory database.
Figure 23B:
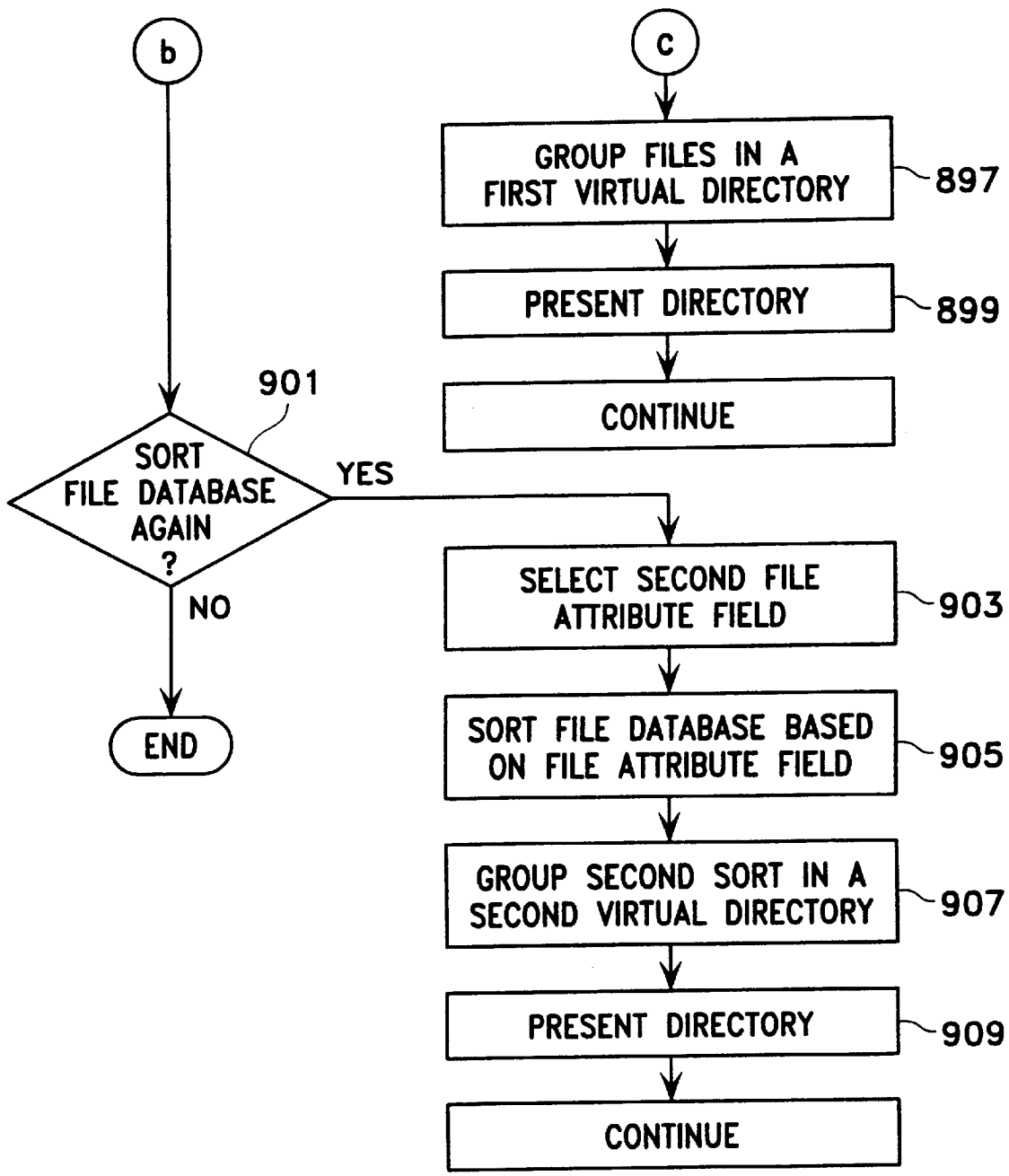

An example of a method used to configure a virtual directory file system is shown in FIG. 22. As a precursor, information from the native file directory can be input to a virtal file directory. (800). Not all of the information need be input to the virtual directory, however. The directory information from the native file directory can be stored on a database of the virtual file directory (804). A private interface can then be established between the virtual directory file system and an application program. Through this interface, a command can be issued to the database (808). If the command indicates that the database is to be reconfigured (812), the virtual file directory can then receive database sort criteria from the application program (816). From the sort criteria, a filter (208) can be created (820). The database can then use the filter to sort the database (820). File attribute fields might be eliminated or arranged in different orders. Furthermore, subsequent sorts can establish the database into a variety of different combinations or groupings. Hence, the configuration command sequences could group a single virtual directory into multiple virtual directories, such as a first virtual directory, a second virtal directory (76) and a third virtual directory. Such is the embodiment in FIG. 1 where three virtal rectories are shown representing parallel configurations of the hard drive, ZIP drive and Tape drive of the native file system. As noted earlier, such configurations are unique from prior attempts in that the configuration can be accomplished by an application program and then retained for later use by either the operating system or a different application level program When the virtual directory system operates on the arrangement of the file attribute information, for example the file path information, it can essentially reconfigure the hierarchy of the virtual database. For example, if the database is sorted so that instead of the file name being the first file attribute, but instead the file subdirectory is the first file attribute, the hierarchy has been redefined. The program code in the program that issues sorting commands to the virtual file directory can constitute a sorter element which sorts the virtal file directory (204). Similarly, program code which issues reconfiguration commands can be a reconfigurer elements which's reconfigures the virtual file directory (216). Program code which issues commands to redefine the hierarchy of the virtual file directory could constitute a redefiner element which redefines the hierarchy of the virtual file directory (220).

The flowchart in FIG. 22 goes on to show how an Information Management Process can also manage the configurable file database. For example, if a backup command is received (824), the virtual file directory system can receive from the application program input on the identity of files to backup and locations of where to store those files (828). This type of information can be seen in FIG. 21. Then, the virtal file directory system can monitor for changes to selected files (832). If changes are detected, for example by an interceptor, the revisions can be backed up to the designated drives (836), i.e. some sort of storage medium for backing up files (224) which could essentially be any type of computer memory. Referring to FIG. 21, if a change is made to the one file designated as "command.com", the revisions could be backed up on the C: drive, the D:drive and the E: drive. Such back ups might be accomplished from the application level or from the operating system level.

FIG. N shows an additional example of configuring a database. As a precursor, an accessible native file directory is established so that it can be accessed by application programs (850). An accessible native file directory is intended to mean a directory which can be accessed, for example, by an operating system or an application program. In addition, a virtual file directory database is configured to have a first maximum number of file attribute fields (853). If it is determined that a file attribute is to be added to the database (856) and if the file attribute field does not exist, formatting directions can be passed to the database and the new file attribute field created. Then, a file can be designated by existing file attribute information (859), the file attribute field selected (862) and the new attribute field information passed to the virtual directory via the private interface. The virtual directory file system can then be presented to the computer system (865) for further use, while still maintaining the ability of the native file system to interact with the computer system.

If a delete file attribute command is detected (868), a file attribute field can be selected (designated) and passed to the virtual directory system (871). Then the virtual directory system can delete the file attribute field (874) and present the database (877). If a sort the file database command is received (880), a selected file attribute field can be passed to the virtual file directory system (891) and a sort carried out on the database (894). As a subsequent step, the sorted files could also be grouped into a first virtual directory (897) and the directory presented for use by the computer system. Similarly, a subsequent sort could be conducted upon a subsequent sort command (901). A second file attribute field could be indicated (903), the virtual file directory database sorted based on that attribute field (905), the second sort grouped into a second virtual directory (907) and the first and second virtual directories presented to the computer system.

FIG. Y illustrates a Windows™95 embodiment where an Information Management Process application program configures the virtual directory file system database. First, the application program forms a filter for the database object and an application program interface referenced as dII api (950). The DII api then performs a DeviceIOControl to the virtual file directory Filesystem Driver (954). At which point the Filesystem Driver (7) saves the filter for the database object into the database (958).

Figure 26:
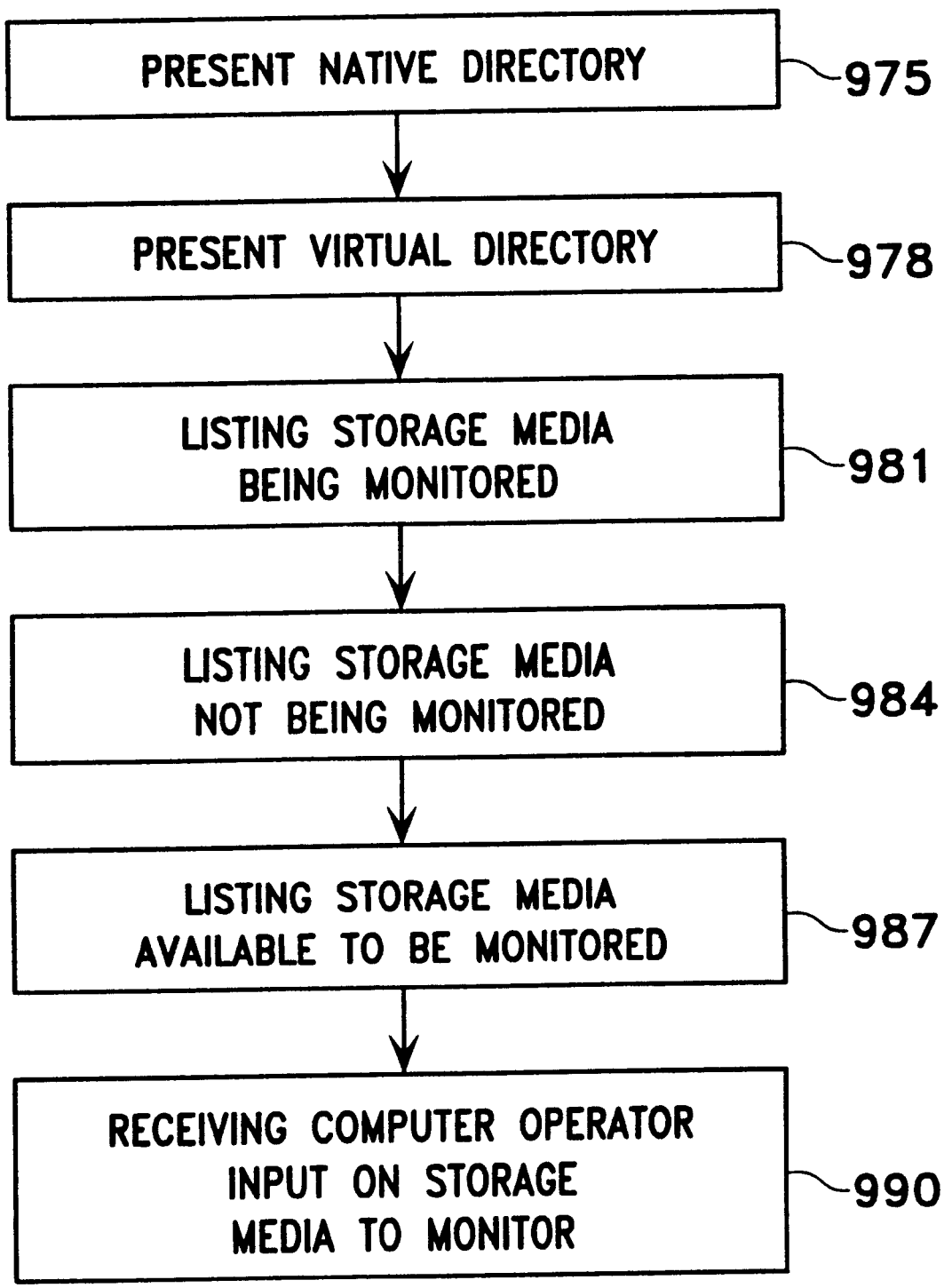
FIG. 26 shows one possible method for presenting information on devices to be monitored and designating devices to be monitored.

As another example of use of an information management process application program to manage the virtal directory file system database, FIG. 26 shows a flowchart for selecting storage media to be monitored. As before, a native file directory system can be presented (975). Also, a virtual directory file system can be presented (978). A listing of storage media being monitored (e.g., when revisions are made to the storage media the revisions are noted on the virtual directory system) is presented to the user on the user's computer screen (981). Furthermore, a listing of storage media not being monitored can be presented on the user's screen as well (984). And a listing of storage media available to be monitored can be presented (987). Then a computer operator can designate which storage media should or should not be monitored (990) and those results can be passed to the virtual file directory system which can either implement the monitoring control in conjunction with an interceptor or pass the information to the interceptor which accomplishes the monitoring itself until it needs to update the virtual directory system.

The virtual directory system may provide the private interface as a mechanism for configuration by the information management processes and as a means for the information processes to extract information not readily supported by the native file system interface.

The ability to configure the virtual directory system via the Ioctl or other such interface, or similar pass through mechanism, may be necessary to provide the multiple view attribute of the virtal directory system. Furthermore, the virtual directory system can report to the native file system that it is not just one storage device but any number of devices. It may be desirable that the virtual directory system reports as a "device 1" and provides a view of all files on all media. As "device 2" it may provide a view of just data on removable media. As "device 3" it may provide a view of the primary physical storage device at a user definable point in time. All of these data views can be configured dynamically via the local or other such interface. In the case of "device 3" the controlling information management process may send a message to the virtual directory system setting the primary physical storage device as a search constraint when the virtual directory system responds to the find first/find next queries. Additionally, the information management process can send a message setting the search constraint of only files created and modified prior to a user definable date. In this case the information management process might be an application that allows the user to select a physical storage device and a calendar date. As the user changes these parameters the virtual directory system may receive the corresponding messages and dynamically reconfigure itself to search for files that meet the criteria. In this manner the user can easily modify how they view the system data and more importantly how all application programs view the data. This unique functionality is designed to augment that available in most standard operating systems.

Information management processes may be apparatus that implement different storage management strategies or may be methods. As discussed above a simple information management process can be used to simply configure views of the virtual directory system. A more complex example might be the implementation of a digital video information management process. The video process might be provided by a cable TV or Satellite TV vendor for recording programming via the computer systems storage device. For example, two classes of data might be downloaded by the vendor, the first being movies that the subscriber wishes to rent or buy which must be recorded on a high capacity device such as a tape drive. The second class of data may be short commercial programming that the vendor wishes to play whenever the subscriber begins to watch a movie or whenever a movie ends. The commercial programming then may require fast access speed to the individual commercial segments that is not easily provided by tape. The video process could then implement a method by which it could load the commercial segment to available hard disk space or high capacity removable disks that can ensure the access characteristics that are required. Further, after the commercials have been played the number of times that the vendor had defined at download time, then the video process could even erase these segments without user intervention. The video information management processes could also assist in organizing data for the user. When the video process records the movie it could send a message to the virtual directory system to create a pseudo device that could be exclusively for movies, thus providing the user with an easy means of finding movies.

Some of the capabilities of the Information Management Process aspect of the invention may include providing an IMP that may connect to a virtal directory system via a secondary communications path provided by the operating system or via a private communications path for the purpose of configuring the system for data management unique processes. It may allow end users to configure the system for the purpose of viewing file directory information in a better organized and efficient manner. The results of this data organization may be viewable through any application capable of accessing the system through the operating system or otherwise. The IMP may act to configure the global system to create a list of files that have been changed that may be of interest to the IMP's unique processes and may make use of the list to more efficiently carry out the IMP's processes.

The information management process would also be fairly straightforward to implement. Using the knowledge of the virtual directory system, it might be configured to communicate with the virtal directory system through its Ioctl or other such interface. Thus through standard operating system and other commands as well known or readily understood, the IMP can be coordinated to achieve configuration of the virtal directory system to emulate any type or arrangement of devices, be they real, or virtual. It could also achieve manipulation, storage, and presentation of the information from the virtual directory system in the manner desired.

Finally the IMPs may be configured as data management applications that know how to use the system to their advantage. Most backup packages or archiving packages know how to manage files that they have transferred themselves but with a persistent system it could be much easier to share information about where files are located between applications. A new type of IMP might be one that pulls digital video from your satellite dish and records it to a DVD or tape. This IMP and the PFS then can team up to allow you to create your own video library, nicely organized on your PC.

Once the basic principles of the invention are understood, the actual implementation of it should be fairly straightforward to a person of ordinary skill in the art. The currently preferred implementation is as an ancillary capability to a standard operating system, such as the Windows™ 95 system. As such, by utilizing readily available source books for programming, operating systems, and database management (such as, the Win 32 DDK, the Win 32 SDK, and the references "Inside Windows™ 95" by Adrian King as published by Microsoft™ Press, Copyright 1994; "Systems Programming for Windows™ 95" by Walter Oney as published by Microsoft™ Press, Copyright 1996; and Inside the Windows™ 95 File System by Stan Mitchell, Copyright 1997 which are hereby incorporated by reference) the software embodiments might be accomplished without undue experimentation.

As should be readily apparent, the invention might be characterized in a variety of different and independent manners. As but one example, the invention might be characterized as a system for providing composite memory information comprising a number of elements such as: a processor, a plurality of memory elements responsive to said processor; a signal connection through which electronic information can be provided between the memory elements and the processor, an interceptor which can access information from the signal connection; a change event sensor responsive to said interceptor through which a change event could be determined to exist. In a more software sense, it might similarly comprise elements such as: an interceptor routine which can access information from said signal connection and a change event sense routine responsive to said interceptor routine through which a change event could be determined to exist.

The discussion included in this patent is intended to serve as a basic description. The reader should be aware that the specific discussion may not explicitly describe all embodiments possible; many alternatives are implicit. Where the invention is described in method or result-oriented terminology, each function of the invention would be achieved by an apparatus element be it hardware- or software-based. Apparatus claims may not only be included for the device described, but also method or process claims may be included to address the functions the invention and each element performs. Equivalent, broader, and more generic terms are implicit in the prior description of each element. Such terms can be substituted were desired to make explicit the implicitly broad coverage to which this invention is entitled. Further, it should be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

What is claimed is:

1. An apparatus comprising:
   a. a native file directory capable of storing directory information;
   b. a second file directory capable of storing at least a portion of the directory information stored on the native file directory and which provides capability beyond the native file directory;
   c. an interface coupled to the second file directory which is capable of communicating commands to the second file directory;
   wherein the native file directory and the second file directory are both capable of containing common file information.

2. The apparatus as described in claim 1 wherein the second file directory is a virtual file directory.

3. The apparatus as described in claim 1 and further comprising a sorter element to which the second file directory is responsive based on input criteria.

4. The apparatus as described in claim 3 wherein the second file directory comprises a database capable of storing file information.

5. The apparatus as described in claim 4 and further comprising a filter to which the file information stored on the database of the second file directory is responsive.

6. The apparatus as described in claim 1 and further comprising a third file directory capable of storing at least a portion of the directory information stored on the first file directory.

7. The apparatus as described in claim 6 wherein the second file directory and the third file directory are accessible to an application program of a computer system.

8. The apparatus as described in claim 7 and further comprising a reconfigurer to which the second file directory is responsive.

9. The apparatus as described in claim 1 wherein the second file directory has a redefinable hierarchy.

10. The apparatus as described in claim 9 and further comprising a redefiner element to which the hierarchy of the second file directory is responsive after a first hierarchy of the second file directory is established.

11. The apparatus as described in claim 9 and further comprising a sorter element to which the second file directory is responsive based on user criteria.

12. The apparatus as described in claim 11 wherein the second file directory comprises a database capable of storing file information.

13. The apparatus as described in claim 12 and further comprising a filter to which file information stored on the database of the second file directory is responsive.

14. The apparatus as described in claim 9 and further comprising a third file directory having a redefinable hierarchy.

15. The apparatus as described in claim 14 wherein the second file directory and the third file directory are accessible to a computer system application program.

16. The apparatus as described in claim 15 and further comprising a reconfigure element capable of reconfiguring the second file directory and the third file directory.

17. The apparatus as described in claim 9 and further comprising at least one storage medium which stores at least one file represented on the second file directory and wherein the at least one storage medium is accessible to the native file directory and the second file directory.

18. The apparatus as described in claim 1 and further comprising at least one storage medium capable of storing at least one file represented on the second file directory and wherein the at least one storage medium is accessible to the native file directory and the second file directory.

19. The apparatus as described in claim 1 wherein the interface is a private interface.

20. The apparatus as described in claim 1 wherein the interface is an input/output of a computer system, an interceptor element, an information management process, a computer system application program, or a remote access interface.

21. The apparatus as described in claim 1 wherein the second file directory is coupled to at least one physical storage device.

22. The apparatus as described in claim 1 and further comprising a reconfigurer which reconfigures the second file directory.

23. The apparatus as described in claim 1 wherein the directory information comprises file attribute information and wherein the native file directory and the second file directory are both capable of containing common file attribute information.

24. The apparatus as described in claim 23 and further comprising a configurable file database presentable as the second file directory and capable of storing at least a portion of the file attribute information of the native file directory.

25. The apparatus as described in claim 24 wherein the configurable file database comprises at least one file attribute field capable of storing file attribute information.

26. The apparatus as described in claim 25 wherein the at least one file attribute field comprises a non-filename attribute.

27. The apparatus as described in claims 25 or 26 wherein the configurable file database can be configured to have additional file attribute fields capable of storing additional file attribute information.

28. The apparatus as described in claim 27 and further comprising an adder element to which is capable of providing a new file attribute field to the configurable file database.

29. The apparatus as described in claim 27 and further comprising a selector element to which a file attribute field is responsive; and a sorter element to which the configurable file database is responsive based on a selected file attribute field.

30. The apparatus as described in claim 29 wherein the file attribute field selected is responsive to the selector element based on user input criteria.

31. The apparatus as described in claim 27 and further comprising a deleter element to which a file attribute field is responsive.

32. The apparatus as described in claim 27 and further comprising a sorter element to which the configurable file database is responsively represented as the second file directory based on a selected file attribute field.

33. The apparatus as described in claim 32 and further comprising a sorter element to which the configurable file database is responsively represented as a third directory based on a second selected file attribute field.

34. The apparatus as described in claim 27 wherein at least two files having the same file name are listed in the configurable file database.

35. The apparatus as described in claim 18 wherein the native file directory is capable of providing file attribute information for the at least one storage medium and the second file directory is capable of providing at least a portion of the file attribute information for the at least one storage medium provided by the native file directory.

36. The apparatus as described in claim 35 and further comprising at least a third file directory capable of providing at least a portion of the file attribute information of the at least one storage medium provided by the native file directory.

37. The apparatus as described in claim 18 and further comprising a retriever element to which a file provided by the second directory is responsive.

38. The apparatus as described in claim 37 and further comprising a determiner element capable of determining whether the at least one storage medium is accessible to the native file directory and the second file directory.

39. The apparatus as described in claim 38 and further comprising a prompter element to which an operator is responsive to make accessible the storage medium to the native file directory and the second file directory.

40. The apparatus as described in claims 37, 38 or 39, wherein the at least one storage medium is remotely accessible to the native file directory and the second file directory.

41. The apparatus as described in claim 40 and further comprising a remote access element to which the at least one storage medium is accessibly responsive.

42. The apparatus as described in claim 41 wherein the at least one storage medium comprises at least one file storage device to which at least one file for use by a computer system is responsive.

43. The apparatus as described in claim 38 and further comprising an access element to which the at least one storage medium is automatically accessibly responsive.

44. The apparatus as described in claim 43 wherein the at least one storage medium comprises at least one file storage device to which at least one file for use by a computer system is responsive.

45. The apparatus as described in claim 43 wherein the at least one storage medium is remotely accessible to the native file directory and the second file directory.

46. The apparatus as described in claim 45 and further comprising a remote access element to which is capable of establishing remote access with the at least one storage medium.

47. The apparatus as described in claim 46 wherein the at least one storage medium comprises at least one file storage device to which at least one file for use by a computer system is responsive.

48. The apparatus as described in claim 18 and further comprising a designator element to which at least one storage medium is designatingly responsive as a medium to monitor for changes to at least one file stored on the designated storage medium.

49. The apparatus as described in claim 48 wherein the at least one storage medium comprises at least one file storage device to which at least one file for use by a computer system is responsive.

50. The apparatus as described in claim 18 and further comprising an access monitor element which is capable of monitoring for an accessible condition of the at least one storage medium.

51. The apparatus as described in claim 50 and further comprising an access element which is capable of accessing at least one storage medium; and a retrieve element which is capable of retrieving information about the at least one storage medium.

52. The apparatus as described in claim 51 wherein the at least one storage medium comprises at least one file storage device which is capable of storing at least one file for use by a computer system.

53. The apparatus as described in claim 18, 48 or 50, and further comprising an updater element which is capable of updating the second file directory with changed file attribute information of the at least one file.

54. The apparatus as described in claim 18 and further comprising a monitor element to which the native file directory is changeably responsive.

55. The apparatus as described in claim 18 and further comprising a presentation element to which a directory of file information for at least one removable storage medium is responsive while the removable storage medium is not accessible to the native file directory and the second file directory.

56. A method of utilizing a file directory for a computer system, the computer system having a native file directory comprising directory information of files, the method comprising:
   a. inputting to a second file directory which provides capability beyond the native file directory at least a portion of the directory information stored on the native file directory;
   b. utilizing a database to store the portion of directory information in the second file directory; and
   c. issuing a command to the database through an interface to the second file directory;
   wherein the native file directory and the second file directory both may contain common file information.

57. The method of utilizing a file directory for a computer system as described in claim 56 and further comprising managing the database based on the command issued to the database by way of the interface.

58. The method of utilizing a file directory for a computer system as described in claim 56 wherein the step of inputting to a second file directory comprises inputting to a virtual file directory at least a portion of the directory information stored on the native file directory.

59. The method of utilizing a file directory for a computer system as described in claim 56 wherein the step of issuing a command to the database comprises issuing the command through a private interface to the second file directory.

60. The method of utilizing a file directory for a computer system as described in claim 57 wherein the step of managing the database based on the command issued to the database by way of the interface comprises reconfiguring the second file directory.

61. The method of utilizing a file directory for a computer system as described in claim 56 wherein the step of issuing a command to the database through an interface to the second directory comprises issuing a command through an interface selected from the group consisting of an input/output of a computer system, an interceptor element, an information management process, a computer system application program, and a remote access interface.

62. The method of utilizing a file directory for a computer system as described in claim 56 wherein the step of issuing a command to the database comprises:
    a. inputting criteria through the interface to the second file directory for sorting of file information stored in the database; and
    b. sorting the file information based on the input user criteria.

63. The method of utilizing a file directory for a computer system as described in claim 62 and further comprising utilizing a filter to filter the file information in the database.

64. The method of utilizing a file directory for a computer system as described in claims 62 or 63 and further comprising presenting the file information stored in the database as the second file directory to an operating system of the computer system.

65. The method of utilizing a file directory for a computer system as described in claims 62 or 63 and further comprising presenting the file information stored in the database as the second file directory to an application program of the computer system.

66. The method of utilizing a file directory for a computer system as described in claim 65 and further comprising issuing a command from the application program to reconfigure the second file directory.

67. The method of utilizing a file directory for a computer system as described in claim 56 and further comprising:
    a. sorting the second file directory;
    b. presenting a first group of file information stored in the database as the second file directory to an operating system of the computer system; and
    c. presenting a second group of file information stored in the database as a third file directory to an operating system of the computer system.

68. The method of utilizing a file directory for a computer system as described in claim 56 and further comprising:
    a. sorting the second file directory;
    b. presenting a first group of file information stored in the database as the second file directory to an application program of the computer system; and
    c. presenting a second group of file information stored in the database as a third file directory to an application program of the computer system.

69. The method of utilizing a file directory for a computer system as described in claim 68 and further comprising issuing a command from the application program to reconfigure the second file directory.

70. The method of utilizing a file directory for a computer system as described in claims 68 or 69 and further comprising issuing a command from the application program to reconfigure the third file directory.

71. The method of utilizing a file directory for a computer system as described in claim 56 wherein step of issuing a command to the database through an interface to the second file directory comprises redefining a hierarchy of the second file directory after a first hierarchy of the second file directory is established.

72. The method of utilizing a file directory for a computer system as described in claims 60, 62 or 63, and further comprising storing at least one file represented on the second file directory to at least one storage medium.

73. The method of utilizing a file directory for a computer system as described in claim 72 wherein step of storing at least one file represented on the second file directory to at least one storage medium comprises storing at least one file represented on the second file directory to at least one physical storage device.

74. The method of utilizing a file directory for a computer system as described in claim 56 wherein the step of inputting to a second file directory which provides capability beyond the native file directory at least a portion of the directory information stored on the native file directory comprises inputting to the second file directory at least a portion of file attribute information stored on the native file directory.

75. The method of utilizing a file directory for a computer system as described in claim 74 wherein the step of utilizing a database to store the portion of directory information in the second file directory comprises utilizing the database to store the portion of the file attribute information in the second file directory.

76. The method of utilizing a file directory for a computer system as described in claim 75 wherein said step of issuing a command to the database through an interface to the second file directory comprises the issuing a command to configure the database to comprise at least one file attribute field.

77. The method of utilizing a file directory for a computer system as described in claim 76 wherein the step of issuing a command to configure the database to comprise at least one file attribute field comprises issuing a command to configure the database to comprise at least one non-filename file attribute field.

78. The method of utilizing a file directory for a computer system as described in claim 77 and further comprising after the step of issuing a command to configure the database to comprise at least one file attribute field, the step of issuing a command to configure the database to comprise additional file attribute fields, wherein at least two files having the same file name are stored in the database.

79. The method of utilizing a file directory for a computer system as described in claim 77 wherein step of utilizing the database to store the portion of the file attribute information in the second directory comprises utilizing the database to store the portion of the file attribute information in the second file directory according to the additional file attribute fields.

80. The method of utilizing a file directory for a computer system as described in claim 76 wherein step of utilizing the database to store the portion of the file attribute information in the second directory comprises utilizing the database to store the portion of the file attribute information in the second file directory according to the at least one file attribute field.

81. The method of utilizing a file directory for a computer system as described in claim 80 wherein step of utilizing the database to store the portion of the file attribute information in the second directory according to the at least one file attribute field comprises utilizing the database to store the portion of the file attribute information in the second directory according to a non-filename file attribute field.

82. The method of utilizing a file directory for a computer system as described in claim 76 and further comprising:

a. selecting a file attribute field;
b. sorting the database based on the file attribute field selected; and
c. presenting the database as the second file directory to the computer system.

83. The method of utilizing a file directory for a computer system as described in claim 82 and further comprising:
a. selecting a second file attribute field;
b. sorting the database based on the selected file attribute field; and
c. presenting the database as a third file directory to the computer system.

84. The method of utilizing a file directory for a computer system as described in claim 82 wherein the step of selecting a file attribute field and sorting the database based on the selected file attribute field comprises selecting a non-filename file attribute field and sorting the database based on the selected non-filename file attribute field.

85. The method of utilizing a file directory for a computer system as described in claim 76 wherein said step of issuing a command to the database through an interface to the second file directory further comprising the step of issuing a command to configure the database to delete at least one file attribute field from the database.

86. The method of utilizing a file directory for a computer system as described in claim 56 and further comprising storing at least one file represented on the second file directory to at least one storage medium.

87. The method of utilizing a file directory for a computer system as described in claim 86 further comprising retrieving the at least one file represented on the second file directory.

88. The method of utilizing a file directory for a computer system as described in claim 87 and further comprising before the steps of storing and retrieving, the step of determining whether the at least one storage medium is accessible to the native file directory and the second file directory.

89. The method of utilizing a file directory for a computer system as described in claim 88 wherein the step of determining whether the at least one storage medium is accessible to the native file directory and the second file directory further comprises prompting an operator to make accessible the storage medium to the native file directory and the second file directory.

90. The method of utilizing a file directory for a computer system as described in claims 87, 88 or 89, and further comprising remotely accessing the at least one storage medium.

91. The method of utilizing a file directory for a computer system as described in claim 88 and further comprising automatically accessing the at least one storage medium.

92. The method of utilizing a file directory for a computer system as described in claim 91 wherein the step of automatically accessing the at least one storage medium comprises automatically accessing remotely the at least one storage medium.

93. The method of utilizing a file directory for a computer system as described in claim 92 wherein the step of automatically accessing remotely the at least one storage medium comprises automatically accessing remotely a physical storage device.

94. The method of utilizing a file directory for a computer system as described in claim 86 and further comprising designating at least one storage medium as a medium to monitor for changes to at lest one file stored on the designated storage medium.

95. The method of utilizing a file directory for a computer system as described in claim 86 and further comprising monitoring for a mounted condition of the at least one storage medium.

96. The method of utilizing a file directory for a computer system as described in claim 95 and further comprising:
a. accessing the at least one storage medium when the at least one storage medium is in a mounted condition; and
b. retrieving information about the at least one storage medium.

97. The method of utilizing a file directory for a computer system as described in claim 95 wherein step of monitoring for a mounted condition of the at least one storage medium comprises checking if the at least one storage medium should be monitored.

98. The method of utilizing a file directory for a computer system as described in claim 97 and further comprising checking for any changes made to the at least one storage medium since the at least one storage medium was removed from the computer system.

99. The method of utilizing a file directory for a computer system as described in claim 98 and further comprising updating the second file directory with changed file attribute information from the storage medium.

100. The method of utilizing a file directory for a computer system as described in claim 95 and further comprising automatically mounting the at least one storage medium.

101. The method of utilizing a file directory for a computer system as described in claim 86, 94 or 96, and further comprising obtaining file attribute information of the at least one file.

102. The method of utilizing a file directory for a computer system as described in claim 101 and further comprising updating the second file directory with file attribute information of the at least one file.

103. The method of utilizing a file directory for a computer system as described in claim 56 and further comprising monitoring for changes made to the native file directory.

104. The method of utilizing a file directory for a computer system as described in claim 103 and further comprising monitoring for a new file saved to the monitored native file directory.

105. The method of utilizing a file directory for a computer system as described in claim 103 or 104 and further comprising monitoring for a new version of a file saved to the monitored native file directory.

106. The method of utilizing a file directory for a computer system as described in claim 104 and further comprising updating the second file directory with file attribute information for the new file.

107. The method of utilizing a file directory for a computer system as described in claim 105 and further comprising updating the second file directory with file attribute information for the new version.

108. The method of utilizing a file directory for a computer system as described in claim 103 and further comprising monitoring for a command to open a file.

109. The method of utilizing a file directory for a computer system as described in claim 108 and further comprising:
a. associating a file handle with a file retrieved from a monitored native file directory;
b. monitoring for the file handle to know when a revised file is being stored to the monitored native file directory;
c. capturing file attribute information for the revised file; and d. storing the file attribute information in the second file directory.

110. The method of utilizing a file directory for a computer system as described in claim 56 and further comprising presenting a directory of file information for at least one removable storage medium while the removable storage medium is not accessible to the native file directory and the second file directory.

111. The method of utilizing a file directory for a computer system as described in claim 110 and further comprising receiving requests for a file stored on the at least one removable storage medium.

112. The method of utilizing a file directory for a computer system as described in claim 110 and further comprising automatically establishing a connection with the at least one removable storage medium.

113. The method of utilizing a file directory for a computer system as described in claim 110 and further comprising prompting a computer operator to connect the at least one removable storage medium.

114. The method of utilizing a file directory for a computer system as described in claim 56 and further comprising querying a computer operator whether file attribute information for a storage medium should be added to the second file directory.

115. The method of utilizing a file directory for a computer system as described in claim 56 and further comprising presenting at least a third file directory for use by the operating system.

116. The method of utilizing a file directory for a computer system as described in claim 56 and further comprising:
   a. receiving an open file command directed to the second file directory, wherein the file data requested is stored on a storage medium; and
   b. causing the file data stored on the storage medium to be opened.

117. The method of utilizing a file directory for a computer system as described in claim 56 and further comprising:
   a. receiving an open file command directed to the second file directory for a file represented on the second directory and stored on a storage medium;
   b. initiating an open file command directed to the storage medium for the file represented on the second file directory; and
   c. reading the file from the storage medium.

118. The method of utilizing a file directory for a computer system as described in claim 56 and further comprising:
   a. receiving a save file command directed to the second file directory for a file to be represented on the second file directory;
   b. initiating a save file command directed to a storage medium where the file is to be stored; and
   c. storing the file on the storage medium.

119. The method of utilizing a file directory for a computer system as described in claim 56 further comprising presenting the second file directory in a hierarchical manner.

120. The method of utilizing a file directory for a computer system as described in claim 56 and further comprising:
   a. entering a file name to be retrieved from the second file directory;
   b. determining which storage medium stores file data for the file name; and
   retrieving the file data.

121. The method of utilizing a file directory for a computer system as described in claim 56 and further comprising:
   a. maintaining file attribute information about at least one file not connected to the computer system; and
   b. presenting the file attribute information of the at least one file not connected to the computer system as a part of the second file directory.

122. The method of utilizing a file directory for a computer system as described in claim 56 and further comprising:
   a. presenting a first file having a file name in the second file directory; and
   b. presenting a second file having the same file name in the second file directory.

* * * * *